Figure 10:
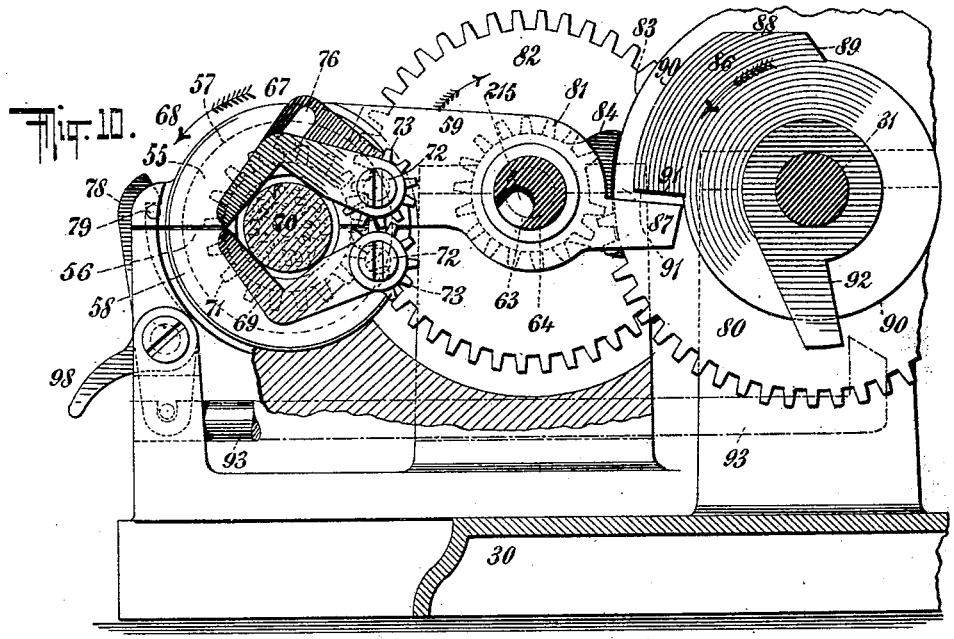

No. 664,919. Patented Jan. 1, 1901.
J. R. WILLIAMS.
CIGAR MAKING MACHINE.
(Application filed Nov. 8, 1900.)
(No Model.) 9 Sheets—Sheet 1.
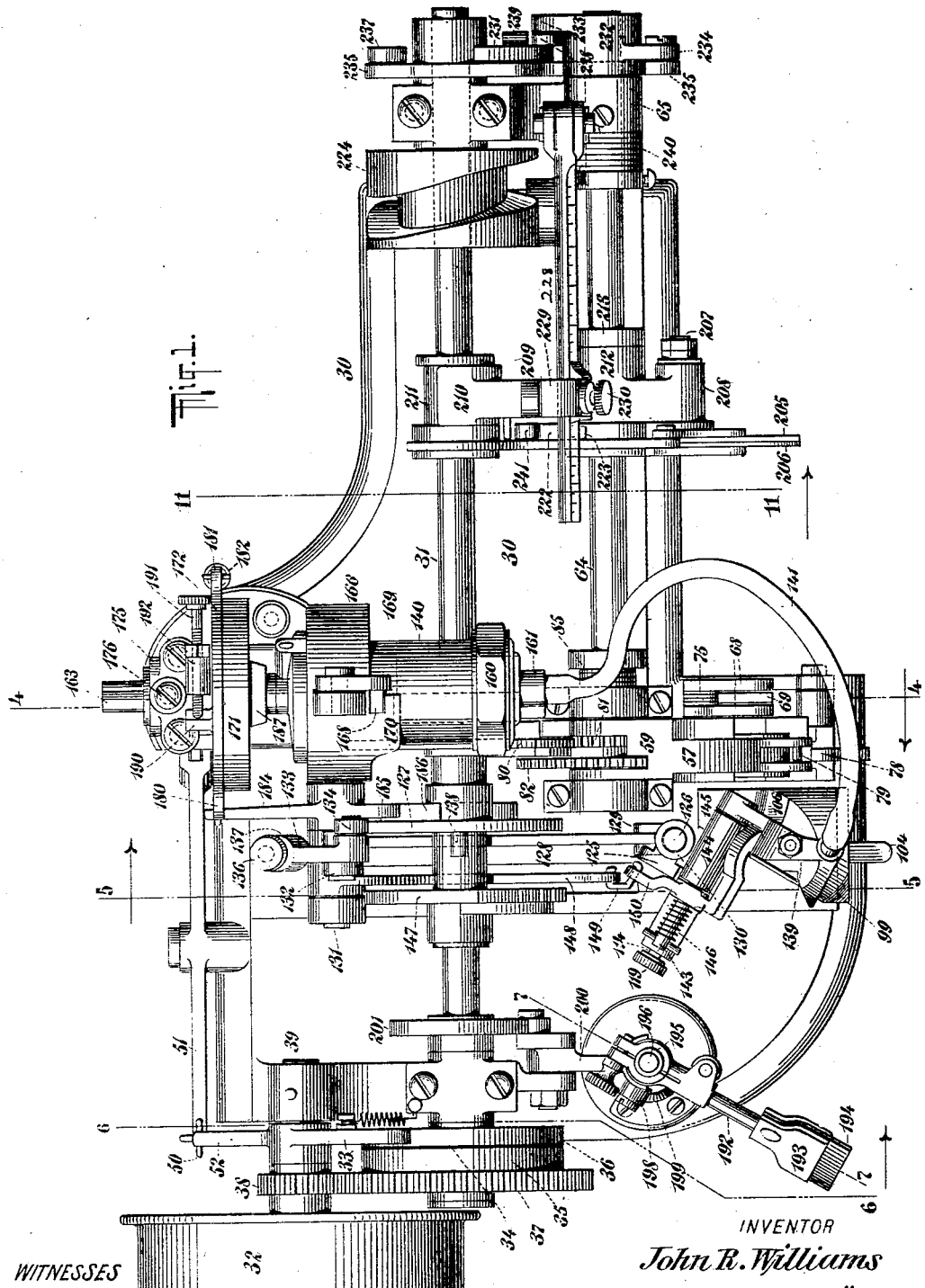
WITNESSES
Gustave Dieterich.
John Kehlenbeck.
INVENTOR
John R. Williams
BY Chas. C. Gill
ATTORNEY

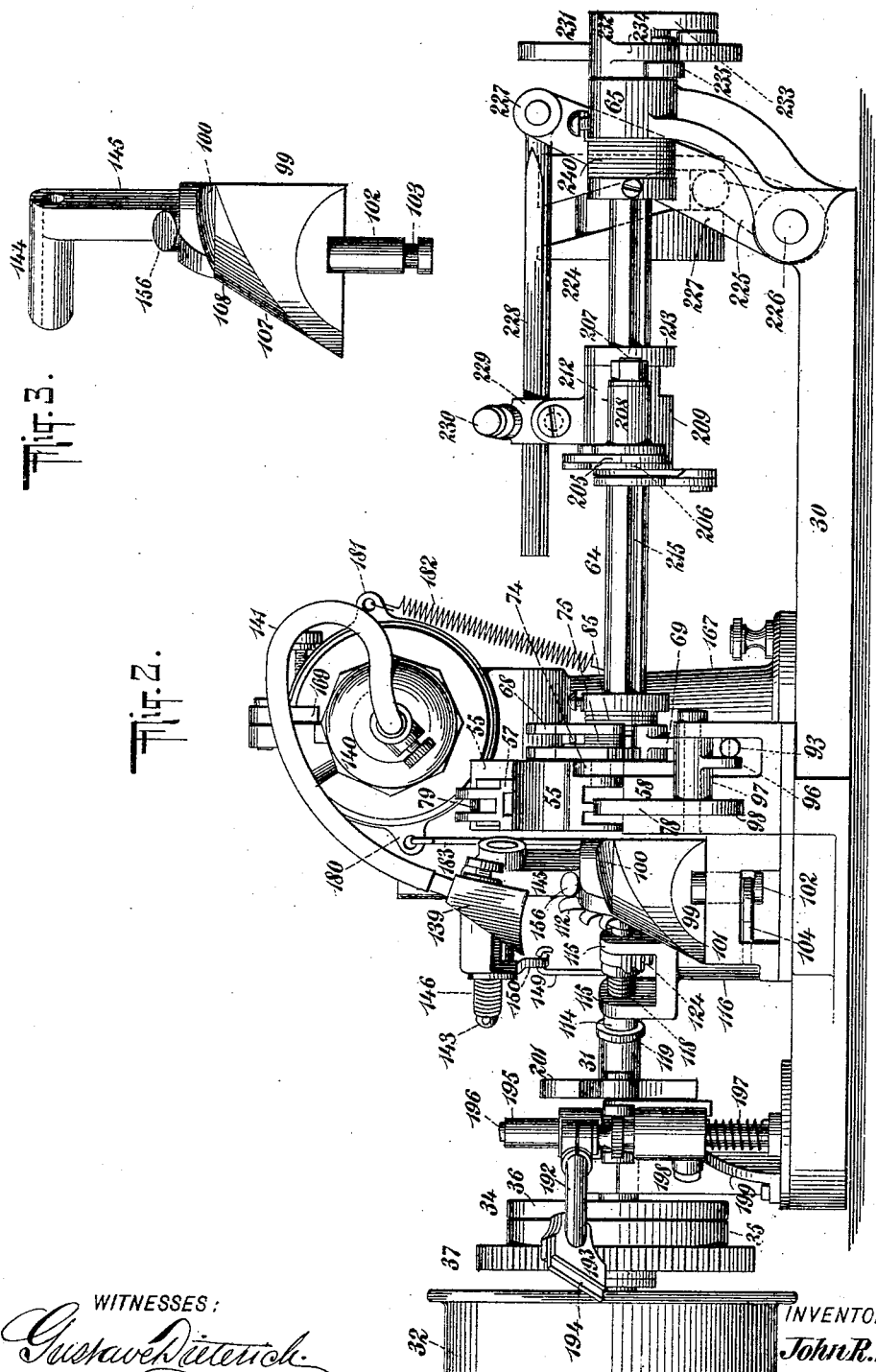

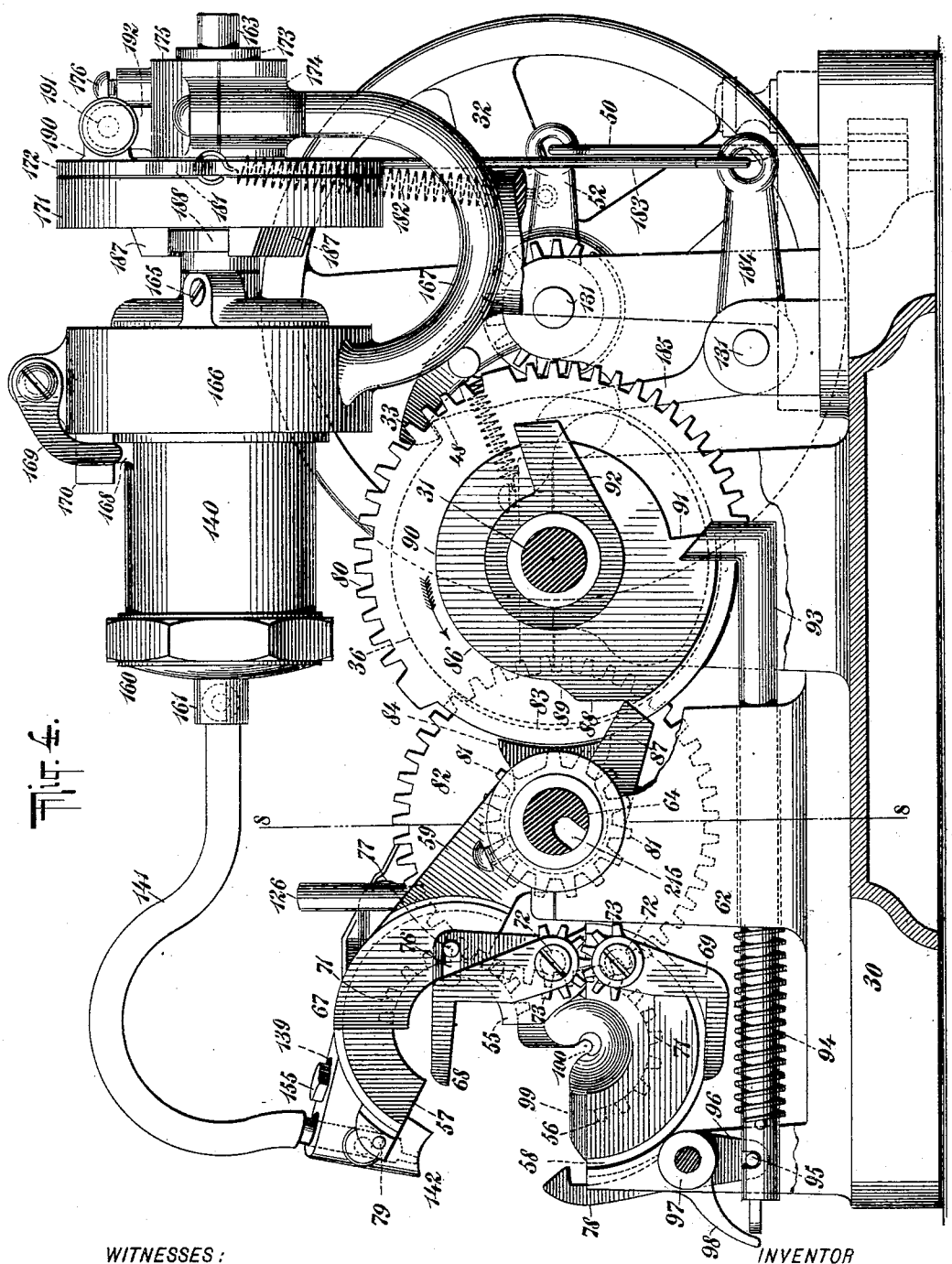

No. 664,919. Patented Jan. 1, 1901.
J. R. WILLIAMS.
CIGAR MAKING MACHINE.
(Application filed Nov. 8, 1900.)
(No Model.) 9 Sheets—Sheet 4.
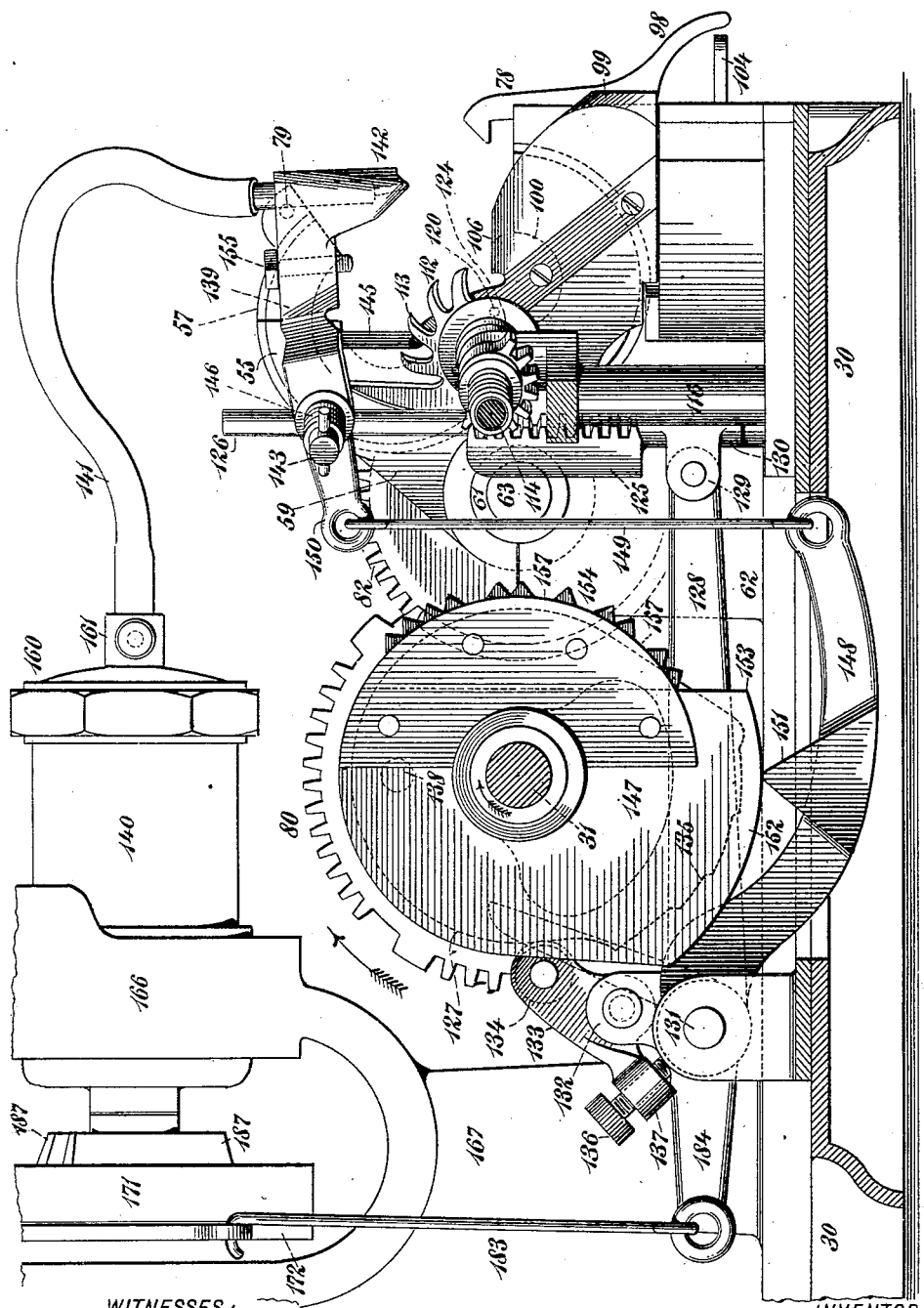
WITNESSES:
INVENTOR
John R. Williams
BY
Chas. C. Gill
ATTORNEY
THE NORRIS PETERS CO., PHOTO-LITHO., WASHINGTON, D. C.

No. 664,919. Patented Jan. 1, 1901.
J. R. WILLIAMS.
CIGAR MAKING MACHINE.
(Application filed Nov. 8, 1900.)
(No Model.) 9 Sheets—Sheet 5.
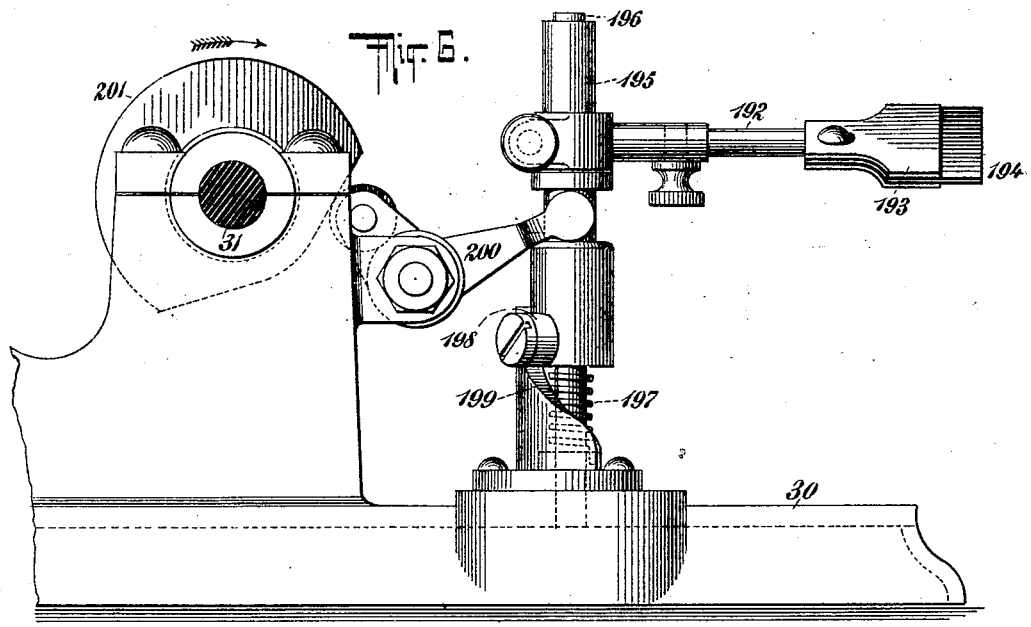
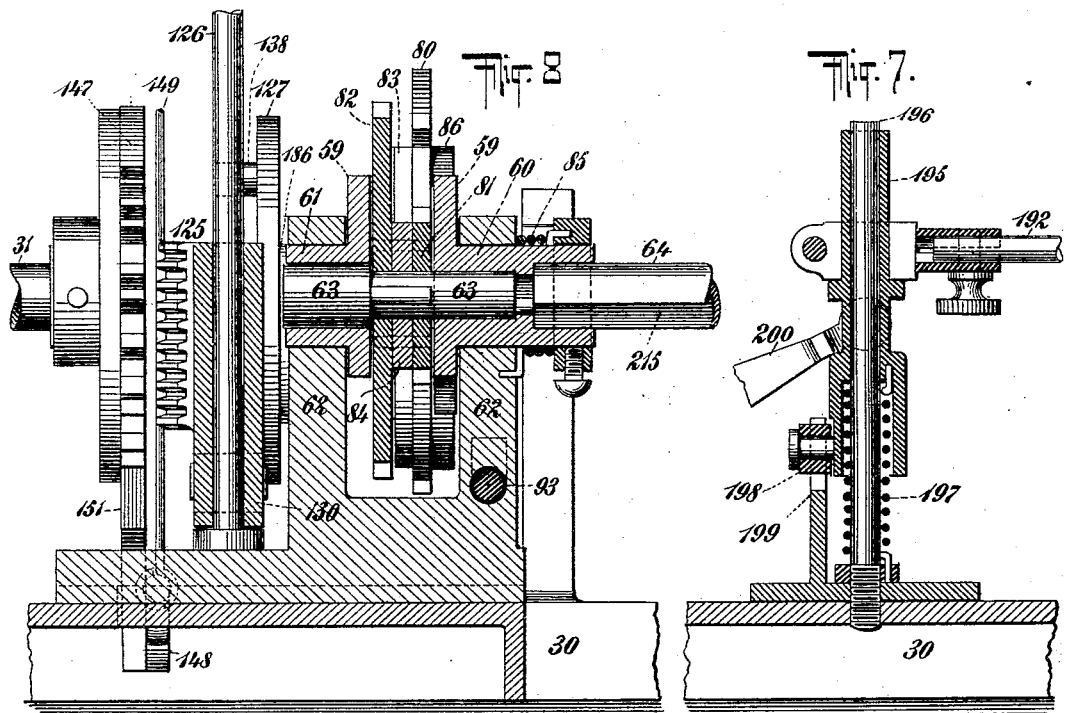
WITNESSES:
Gustave Dieterich
John Kehlenbeck
INVENTOR
John R. Williams
BY Chas. C. Gill
ATTORNEY No. 664,919. Patented Jan. 1, 1901.
J. R. WILLIAMS.
CIGAR MAKING MACHINE.
(Application filed Nov. 8, 1900.)
(No Model.) 9 Sheets—Sheet 6.

WITNESSES: Gustave Dieterich, John Rehlenbeck.

INVENTOR John R. Williams
BY Chas. C. Gill
ATTORNEY

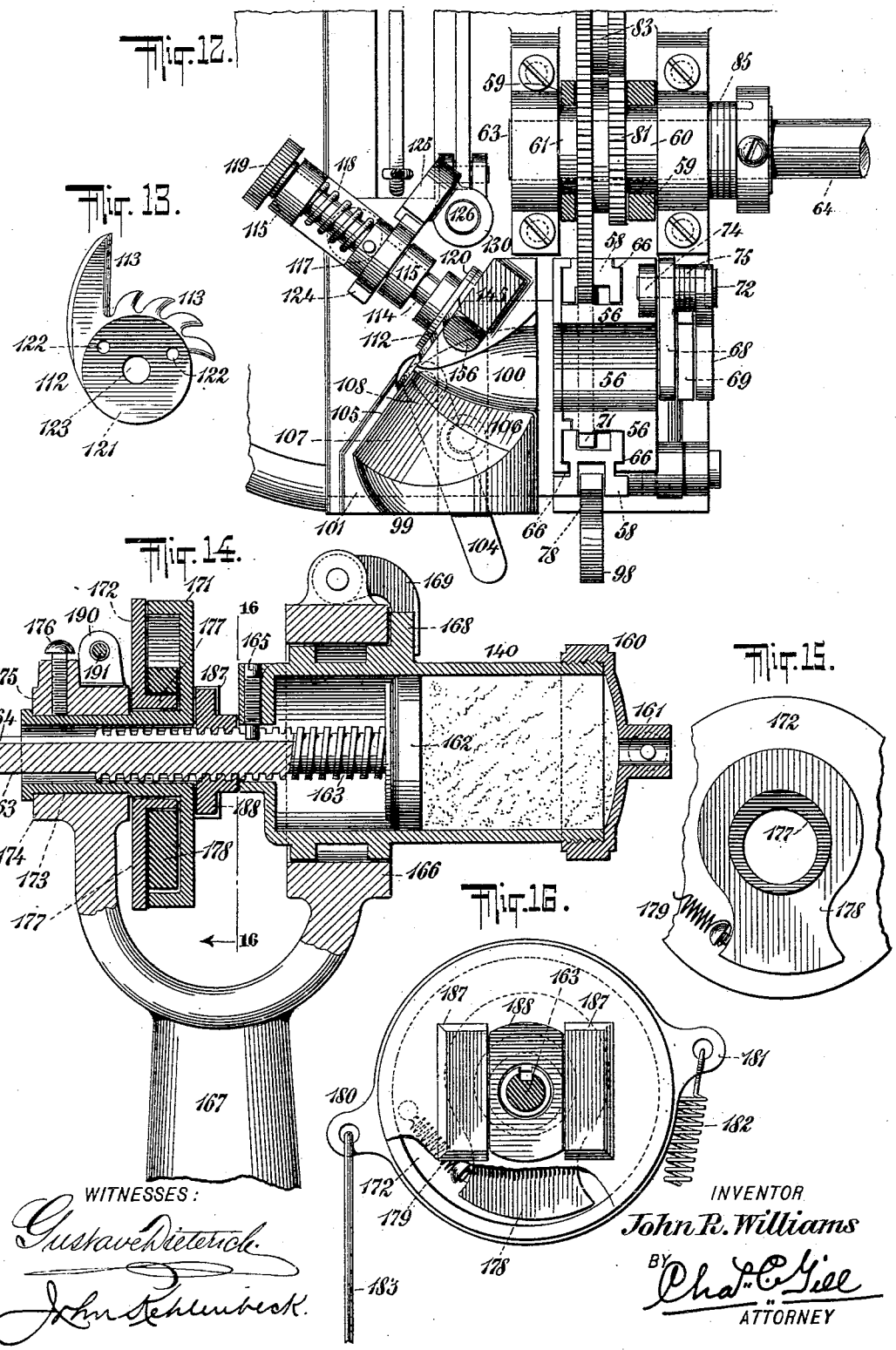

No. 664,919.  
J. R. WILLIAMS.  
CIGAR MAKING MACHINE.  
(Application filed Nov. 8, 1900.)  
Patented Jan. 1, 1901.
(No Model.)  
9 Sheets—Sheet 8.
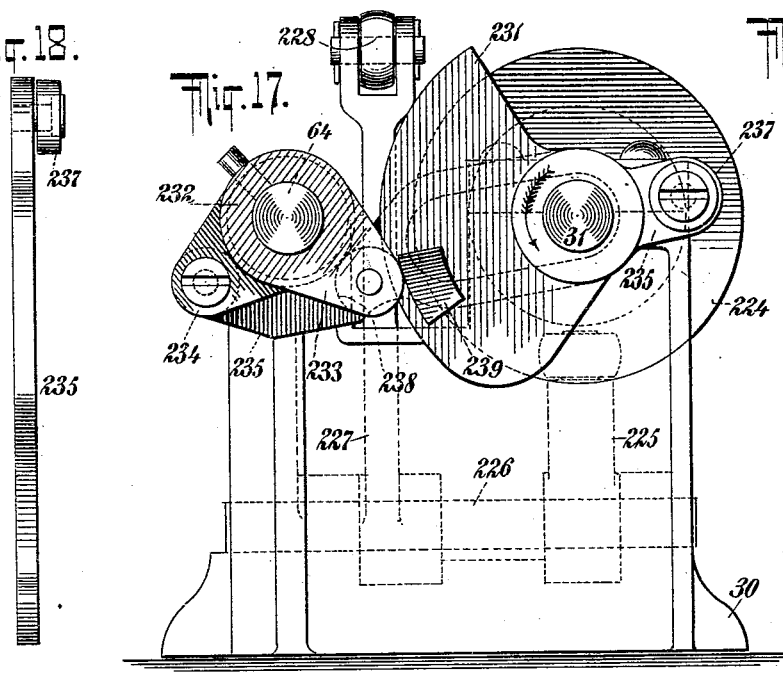
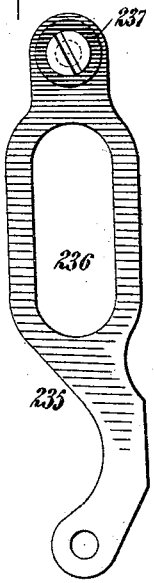
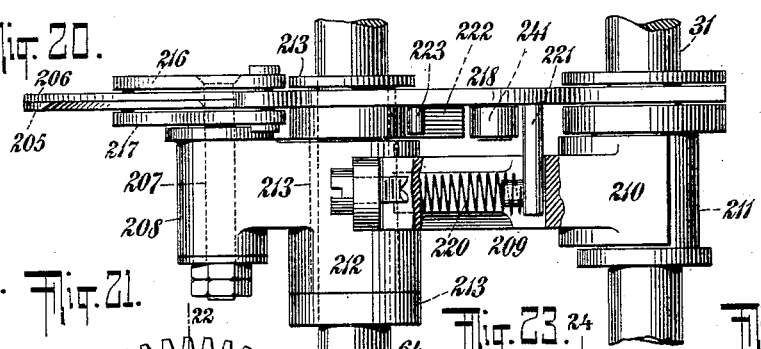
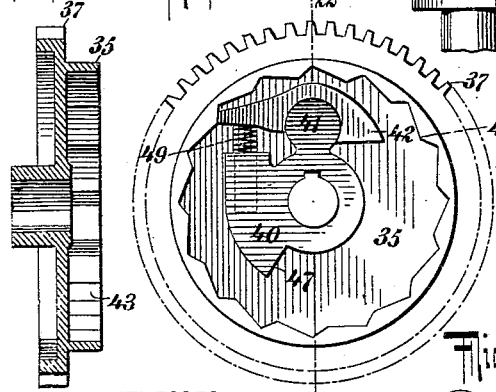
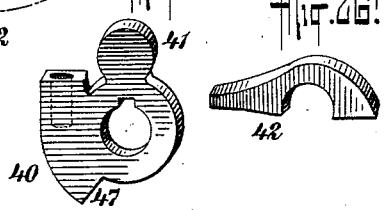
WITNESSES:  
INVENTOR  
John R. Williams  
BY  
ATTORNEY

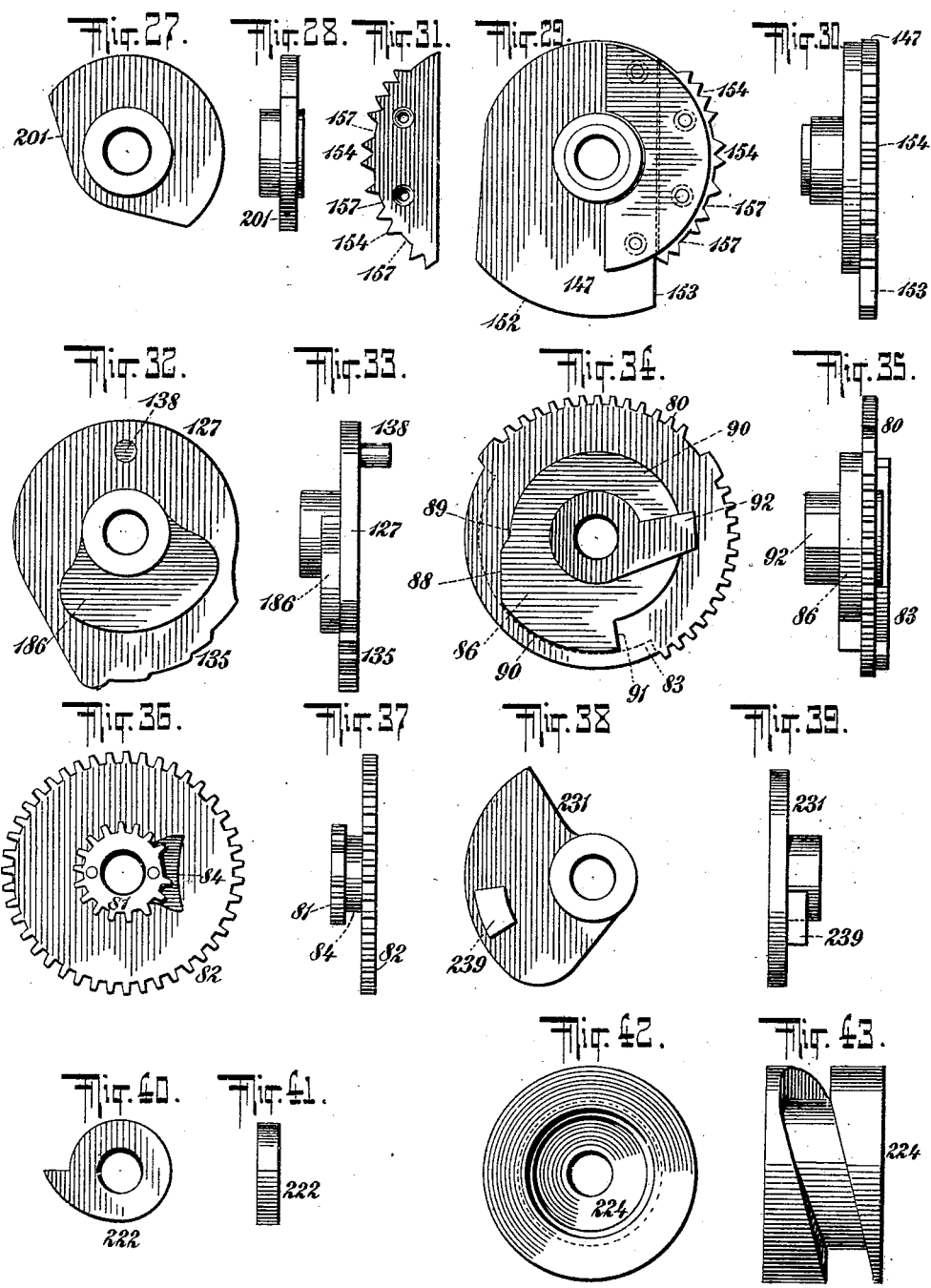

UNITED STATES PATENT OFFICE.

JOHN R. WILLIAMS, OF EAST ORANGE, NEW JERSEY, ASSIGNOR TO THE JOHN R. WILLIAMS COMPANY, OF NEW YORK, N. Y.

CIGAR-MAKING MACHINE.

SPECIFICATION forming part of Letters Patent No. 664,919, dated January 1, 1901.

Application filed November 8, 1900. Serial No. 35,832. (No model.)

*To all whom it may concern:*

Be it known that I, JOHN R. WILLIAMS, a citizen of the United States, and a resident of East Orange, in the county of Essex and State of New Jersey, have invented certain new and useful Improvements in Cigar-Making Machines, of which the following is a specification.

The invention relates to improvements in cigar-making machines, and particularly to machines for forming the head ends of cigars.

In accordance with my invention the cigar after having been wrapped and while the end of the wrapper is loose and projecting from the end of the cigar ready to be finally applied and the head of the cigar finished in the usual manner is introduced to the machine made the subject hereof, and the said projecting end of the wrapper is by means of said machines and without the employment of hand-labor applied to the end of the cigar and the latter finished to completion.

I have termed the machine made the subject hereof a "cigar-heading" machine, since, as above indicated, the wrapper is applied by any of the usual methods to the body of the cigar, leaving the end of the wrapper loose at the head of the cigar, and the head of the cigar is then completed by said machine.

I have embodied my invention in the machine shown in the accompanying drawings, said machine comprising a rotatory frame having a clamp in which the cigar to be finished or headed is placed, a thimble having a cone-shaped recess to receive the head end of the cigar held by the said clamp, a knife or cutter for trimming the projecting end of the leaf at the head end of the cigar, pasting devices for properly applying an adhesive substance to the leaf in order to secure it permanently in place, means for trimming the tuck end of the cigar, means for removing the cigar from the said rotatory frame after the cigar has been completed, and operative mechanism for actuating the various parts hereinbefore referred to.

The objects of the invention are to diminish the time, labor, and expense incident to finishing the heads of cigars and to produce a machine which will automatically and perfectly finish the cigars, the latter when ejected from the machine being ready for the market.

The invention will be fully understood from the detailed description hereinafter presented, reference being had to the accompanying drawings, in which—

Figure 11:
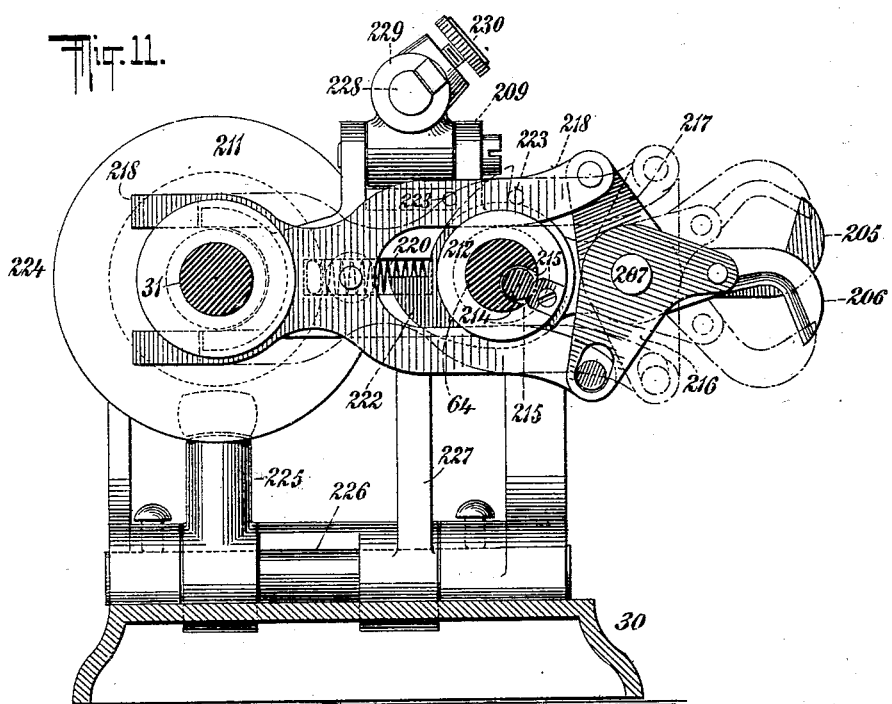

Figure 1 is a top view of a machine constructed in accordance with and embodying the invention. Fig. 2 is a front elevation of same. Fig. 3 is a front elevation, on an enlarged scale, of the thimble which receives the head end of the cigar to complete the same. Fig. 4 is an enlarged vertical transverse section of the machine on the dotted line 4 4 of Fig. 1. Fig. 5 is a like section through the machine on the dotted line 5 5 of Fig. 1. Fig. 6 is a like section of the machine on the dotted line 6 6 of Fig. 1. Fig. 7 is a vertical section through a portion of the machine on the dotted line 7 7 of Fig. 1. Fig. 8 is a longitudinal vertical section through a portion of the machine on the dotted line 8 8 of Fig. 4. Fig. 9 is a detached perspective view of a short shaft 63, shown in side elevation in Fig. 8. Fig. 10 is an enlarged transverse section through the machine on the line of the clamping-fingers 68 69 and shows the cigar in position between said fingers, this section corresponding substantially with Fig. 4, but showing the clamping parts in their closed operative position, while in Fig. 4 the same parts are shown in their normal at-rest position. Fig. 11 is a vertical transverse section through the machine on the dotted line 11 11 of Fig. 1. Fig. 12 is a top view, partly in horizontal section, through a portion of the machine, looking downward upon the thimble 99 and lower half 56 of the rotatory frame 67, by which the cigar is given its rotary motion. Fig. 13 is a detached side elevation of the knife which in use trims the overhanging portion of the tobacco-leaf adjacent to the left-hand end of the thimble 99. Fig. 14 is an enlarged central vertical longitudinal section through the paste-reservoir and parts connected therewith. Fig. 15 is a view, partly broken away, of the inner face of the plate 172, forming a part of the clutch mechanism for operating the piston of the paste-reservoir. Fig. 16 is a vertical section through the piston-rod of the paste-reservoir, the section being on the dotted line 16 16 of Fig. 14 and looking in the direction of the arrow. Fig. 17 is an elevation of the machine looking at the right-hand end of the same. Fig. 18 is an enlarged edge view of the operating-arm 235, connected with the mechanism at the right-hand end of the machine. Fig. 19 is a face view of same. Fig. 20 is a top view, partly broken away, of the carriage which carries the tuck-cutting knives. Fig. 21 is an inner face view of one section of the clutch mechanism connected with the main driving-shaft of the machine. Fig. 22 is a vertical section of same on the dotted line 22 22 of Fig. 21. Fig. 23 is an inner face view of the other section of said clutch mechanism connected with the main driving-shaft. Fig. 24 is a vertical section of same on the dotted line 24 24 of Fig. 23. Fig. 25 is a detached perspective view of a block 40, carried by the main driving-shaft intermediate the clutch-sections shown in Figs. 21 and 23. Fig. 26 is a detached perspective view of a dog 42, forming a part of the clutch mechanism connected with the main driving-shaft; and Figs. 27 to 43, inclusive, illustrate detailed views of the various cams and gears forming parts of the machine and are specifically referred to, and the said parts are designated by reference-numerals hereinafter.

In the drawings, 30 denotes the supporting bed or frame of the machine, 31 the main driving-shaft, and 32 the usual belt-wheel by which power may be applied to the shaft 31 and from said shaft to the operative parts of the machine. The shaft 31 is provided with clutch mechanism of any suitable character which will automatically cut off the power of the belt-wheel 32 from the shaft 31 at the end of each rotation of the latter.

The machine will be provided with a pawl 33, Figs. 1 and 4, for automatically effecting the disengagement of the parts of the main clutch and the consequent stopping of the shaft 31 at the end of each rotation of said shaft, and upon the release of said pawl 33 from the clutch mechanism by the manual act of the operator said clutch mechanism will again communicate the motion of the belt-wheel 32 to the main driving-shaft 31.

Several forms of clutch mechanism for stopping the shaft 31 at the end of each of its rotations and again starting the shaft 31 are well known in this art, and this invention is not limited to any special means for stopping or starting the shaft 31. In the drawings, however, I illustrate a specially desirable clutch mechanism, the details of which are presented in Figs. 21 to 26, inclusive, and the exterior of which is shown in Figs. 1 and 2, in which it will be observed that the clutch 34 is mounted on the end of the main driving-shaft 31 and comprises two main parts 35 36, the former of which is integral with a spur gear-wheel 37, which is in mesh with the pinion 38, connected with the belt-wheel 32, said belt-wheel and pinion being mounted on the stud or short axle 39, upon which is also freely mounted the pawl 33, hereinbefore mentioned. The main parts 35 36 of the clutch 34 are brought into face-to-face contact, as indicated in Fig. 2, and are normally free upon the shaft 31, while keyed upon said shaft and inclosed between said parts 35 and 36 is the block 40, having a bearing-head 41, upon which is mounted the dog 42, Figs. 21 to 26, inclusive, which has a socket to fit and turn on said head 41 and an end to lock with the serrated inner surface 43 of the rim of the clutch-section 35 when pressed and held outward against said surface, as shown in Fig. 21, by the spring 49, carried by said block 40. When the clutch-section 35 and dog 42 are in engagement with one another, as shown in Fig. 21, the motion of the belt-wheel 32 and pinion 38 will be communicated to the gear 37 and clutch-section 35 and be by said clutch-section 35 imparted through the dog 42 and block 40 to the driving-shaft 31, whereby said shaft will be rotated. The clutch-section 36, in connection with the pawl 33, is utilized to disengage at the proper time the dog 42 from the clutch-section 35, so that said section 35, while continuing to rotate, shall have no effect upon the block 40 and driving-shaft 31, and to this end the clutch-section 36 has on its inner face the stud 44, which lies in near relation to the shank end of the dog 42 and which when the clutch-section 36 is arrested by the pawl 33 will form an obstruction against which said shank end will press, with the result of turning the outer end of the dog 42 from the said surface 43 and allowing the clutch-section 35 to continue its rotation without imparting its movement to the driving-shaft 31. The stud 44 of the clutch-section 36 preferably contains a yielding spring-plunger 45 for contact with the shank end of the dog 42, and said clutch-section 36 is formed with the inner stud 46, which lies close to the angular edge 47 of the block 40 and serves to assure the correct relation of the stud 44 to the dog 42. The engaging end of the pawl 33 rides on the edge of the clutch-section 36, and at the end of each revolution of the main driving-shaft 31 said end of said pawl hooks upon the shoulder 48 on said edge and holds the said section 36 stationary, with the result, above described, of cutting off the power from and thus arresting the shaft 31.

The pawl 33 will hold the clutch-section 36 stationary, and thereby keep the power from the shaft 31 until the pawl 33 is either manually or by suitable means lifted from the shoulder 48 of the clutch-section 36, upon which being done the spring 49 will again force the dog 42 into engagement with the serrated surface 43 of the clutch-section 35 and power will be again imparted to the shaft 31, the latter then continuing to revolve until the pawl 33 again meets the shoulder 48 and arrests the clutch-section 36.

The pawl 33 will be controlled by any suitable means; but in the present instance it is connected by a link 50, Fig. 4, with a pivoted lever 51, Fig. 1, which is heavier at its right-hand end and keeps the hooked end of said pawl in contact with the edge of the clutch-section 36, with the result that at each revolution of the said section 36 the pawl 33 will engage the shoulder 48 and cut off the power of the belt-wheel 32 from the driving-shaft 31.

When the pawl 33 is to be freed from the clutch-section 36, so as to permit the power of the belt-wheel 32 to again reach the shaft 31, the said pawl 33 may be lifted by hand from the said section 36 for a moment to permit the said section to start to rotate, or the same result may be accomplished by pressing upward on the right-hand end of the lever 51, and thereby causing the left-hand end of said lever to pull downward on the arm 52 of said pawl 33 and temporarily lifting the engaging end of said pawl from the shoulder 48 of the clutch-section 36.

*Rotary frame and cigar-clamp.*—The cigar is held at its body portion during the completion of the head end of the cigar by spring-pressed clamping-fingers 68 69, Figs. 4 and 10, which are connected with and carried by a rotatory frame, which for convenience is designated in its entirety by the numeral 67 and is in the form of a broad divided gear-wheel, Figs. 4, 10, and 12, whose two halves (numbered 55 56) are mounted to rotate when together within a frame or casing composed of the upper and lower sections 57 and 58, the latter being rigidly mounted and the upper section 57 being in the form of a cap and adapted to be raised from and lowered upon the lower section 58. The upper section 57 always carries one-half 55 of the frame 67, and said section 57 is integral with a frame 59, which is formed with the sleeves 60 61, Fig. 8, mounted to turn in bearings at the upper ends of the standards 62 62 and freely receiving the short shaft 63, which may rotate within said sleeves 60 61 and, as hereinafter explained, contributes to the rotation of the rotatory frame 67 and clamp-fingers 68 69, together with the cigar 70, Fig. 10, held by said fingers. The outer end of the sleeve 60 also furnishes a bearing for the left-hand end of the oscillatory shaft 64, which extends longitudinally of the machine and has its right-hand end mounted in the standard 65.

The upper and lower sections 57 58 of the frame or casing for the rotatory frame 67 form when together a circular runway for said frame 67, and said sections 57 58, as more clearly shown in Fig. 12, are grooved at opposite edges, as at 66, to receive the flanged edges of said rotatory frame 67. The gear-teeth of the frame 67 are numbered 71 in Fig. 12, which more clearly shows the width and defines the location of said teeth, and said gear-teeth when the sections 55 and 56 are together form a complete gear-wheel and constitute the means by which rotary motion is imparted to said frame 67, the clamp-fingers 68 69, and cigar 70.

The clamp-fingers 68 69 are of a form to inclose the cigar 70 between them, and there are two fingers 68 and one finger 69, the latter lying on the plane of the space between the fingers 68. The fingers 68 and 69 are at their shank ends secured on pins 72, Figs. 4 and 10, and provided with toothed segments 73, which are in constant mesh with each other and insure the simultaneous and uniform movement of said fingers 68 and 69 toward and from each other. The pins 72 72, holding the fingers 68 69, are both carried by the lower half 56 of the frame 67, the upper pin 72 being fastened to an arm 74, Figs. 2 and 12, which extends upward from said half 56. Upon the said upper pin 72 is a coiled spring 75, Figs. 1, 2, and 12, which presses against the fingers 68, and consequently exerts a constant tension to close the fingers 68 69 toward each other. The inner one of the fingers 68 contains in an extension a slot 76, Figs. 4 and 10, receiving a pin 77, extending outward from the upper half 55 of the frame 67, and said pin 77 when the cap-section 57 and upper half 55 of the frame 67 are moving to their open position (shown in Fig. 4) engages the said fingers 68 and compels the same to be open upward, whereby, due to the segments 73, the clamp-fingers are caused to separate from one another and release the cigar. When the cap-section 57 closes downward to move the half 55 of the frame 67 downward to its closed position, the pin 77 allows the fingers 68 69 to first close against the cigar 70 under the pressure of the spring 75 and then follows down the slot 76, Fig. 10, to prevent said fingers from separating during the rotation of said fingers and cigar with the frame 67.

The surfaces of the sections 55 56 do not bind against the body of the cigar 70, but receive between them the cigar, and the fingers 68 69 clamp the cigar and hold it centrally within the bore or chamber formed between said sections 55 56. The fingers 68 69 form, however, a part of the rotatory frame 67 and rotate with it.

The sections 57 58 of the casing for the frame 67 when closed together by the lowering of the section 57 become locked together by the automatic engagement of the latch 78 with the pin 79 of the section 57, Figs. 4 and 10, and said section 57 cannot be opened upward until said latch 78 is released from said pin 79, which release is effected automatically, as hereinafter described.

The frame 67 receives its motion from the main driving-shaft 31 through the gear-wheel 80, Figs. 34 and 35, on said shaft, Figs. 1, 4, 5, 8, and 10, the pinion-wheel 81, to mesh with said gear-wheel 80 and mounted on the shaft 63, Fig. 8, and the gear-wheel 82, Figs. 36 and 37, which is in one piece with said pinion-wheel 81 and in direct engagement at all times with the gear-teeth of the sections 55 and 56 of the clamp-frame 67. The gear-wheel 82 thus receives its motion from the main driving-shaft 31 and directly effects the rotation of the frame 67, the latter during the rotation of the said gear-wheel 82 causing the cigar and fingers 68 69 to rotate with it.

It is desirable that the frame 67 shall cease to rotate before the driving-shaft 31 completes its revolution, and hence means are provided for locking the gear-wheel 82 against movement during the latter part of the rotation of the driving-shaft 31, and these means consist in omitting a part of the teeth from the gear-wheel 80 and in providing upon one edge of the said gear-wheel 80 a flange 83 for engagement with the locking-dog 84, Figs. 4, 8, 10, 36, and 37, which is rigid with the pinion-wheel 81 and gear-wheel 82. The pinion-wheel 81 will rotate so long as the teeth of the gear-wheel 80 are moving against the same; but it is desirable that after the teeth of the gear-wheel 80 leave the teeth of the pinion-wheel 81 the said pinion-wheel, with its gear-wheel 82, shall be absolutely locked against all motion during the continuance of the motion of the driving-shaft 31 and gear-wheel 80, and to secure this locking of the pinion-wheel 81 and its parts the dog 84 engages the flange 83, as shown in Fig. 10, and remains in such engagement during all of the time that the gear-wheel 80 is in motion after its teeth have left the pinion-wheel 81. The length of time the dog 84 shall remain in engagement with the flange 83 is governed entirely by the length of the latter, and hence the flange 83 will be of such length as to pass from contact with the dog 84 at the time the teeth of the gear-wheel 80 are to again engage the pinion-wheel 81. The gear-wheel 80 thus transmits the power from the driving-shaft 31 for rotating the frame 67 and may continue to revolve with said driving-shaft 31 without affecting the frame 67 during the latter part of the motion of said driving-shaft 31. The gear-wheel 80 performs one rotation with the driving-shaft 31 and then comes to a stop with said shaft; but the cigar-frame 67 comes to a stop prior to the stoppage of the gear-wheel 80 and driving-shaft 31 in order that after the wrapper has been applied upon the head end of the cigar the tuck end of the latter may be trimmed, the cigar-frame 67 opened, and the cigar removed before the power-shaft 31 comes to a stop and after the frame 67 has become arrested. The relative proportions of the pinion-wheel 81, the gear-wheel 80, and gear-wheel 82 are such that the cigar-frame 67 will have a rapid rotation and will perform about four revolutions before coming to a stop during the one rotation of the main driving-shaft 31, the cigar being thus given a rather rapid rotation for the purpose of finishing, in the manner hereinafter described, the head end of the same.

The means for lowering the upper or cap section 57 to close the rotatory frame 67 is the coiled spring 85, Figs. 1, 2, and 8, on the sleeve 60, which is integral with said cap-section 57 and frame 59, of which said section is a part, and the means for elevating said cap-section 57, so as to open the frame 67 and fingers 68 69, is the cam 86, Figs. 4, 10, 34, and 35, which is on the main shaft 31 and adapted to engage the arm 87, which projects rearwardly from the said frame 59. The cam 86 and arm 87 are shown in Fig. 4 in their normal at-rest position, and when in such position the edge 88 of the cam 86 engages the end of the arm 87 and holds the frame 59 in an inclined position, with its cap-section 57 elevated. When during the movement of the shaft 31 the recess 89 of the cam 86 reaches the end of the arm 87, it will allow the spring 85 to turn the front portion of the frame 59 downward, thus closing the cap-section 57 to the position in which it is shown in Fig. 10. While the regular portion 90 of the cam 86 is passing the end of the arm 87 of the frame 59, said arm will be unaffected by said cam and the cap-section 57 will remain closed, and when the projection 91 of the cam 86 contacts with the arm 87 it will depress the latter and turn the cap-section 57 upward, said section remaining in its upward or open position, Fig. 4, until after the machine comes to a stop and is started again. The machine always comes to a stop with the cam 86 and arm 87 in the relative positions in which they are shown in Fig. 4, the opening of the cap-section 57 resulting in the release of the cigar and the restoring of the rotatory frame 67 and fingers 68 and 69 into a condition preparing them to receive another cigar.

It has been explained above that when the cap-section 57 closes downward it becomes locked by the latch 78, and hence just prior to the opening upward of said section 57 by the cam 86 the latch 78 must be released, and to effect this result an arm 92, Figs. 4, 10, 24, and 35, is provided on one face of the cam 86, said arm having for its purpose to contact with and push the spring-rod 93 inward, and thereby release the latch 78 just prior to the cam 86 acting to elevate the section 57. The rod 93 is adapted to slide in a horizontal bearing and has a spring tension outward by reason of the spring 94, Fig. 4, and said rod 93 at its front portion engages a pin 95, carried by an arm 96, extending downward from the tubular rock-shaft 97, carrying said latch 78. The spring 94 and rod 93 act to keep the latch 78 pressed inward at its upper end, so that it may automatically engage the pin 79 of the cap-section 57 as soon as the latter closes downward, and the arm 92 in the regular operation of the machine releases the latch 78 by pushing inward on the rod 93, so as to permit the cam 86 to elevate said section 57. The latch 78 is equipped with a suitable thumb-piece 98, by which the operator may at any time desired turn the upper end of the latch 78 outward to free the cap-section 57.

It will be observed on reference to Fig. 4 that the teeth of the gear-wheel 82 engage the teeth of both sections of the rotatory frame 67, the center of said gear-wheel 82 being substantially on a line with the center of said frame, and in view of this arrangement the upper section 55 of said frame may roll upward and downward upon said gear-wheel 82 during the opening and closing of the upper section or cap 57 of the frame-casing. When the upper section or cap 57 is lowered from the position in which it is shown in Fig. 4, the said section 55 will have a slight turning motion on the said section or cap 57, so that upon the upper section 55 reaching the lower section 56 the halves 55 and 56 will form a complete cylinder, with gear-teeth extending entirely around the same.

*The thimble and its coöperating parts.*— The means for giving to the cigar its rotary motion, by which the loose portion of the wrapper at the head end of the cigar is caused, by the coöperation of other devices hereinafter described, to be wrapped around said end having been described, I will proceed to a description of the thimble 99 and the parts connected and coöperating therewith, by which the loose portion of the wrapper at the head end of the cigar is controlled, trimmed, and caused to be directly and properly wrapped upon and secured to the cigar.

The thimble 99 is preferably of metal and contains a substantially conical recess 100 to receive the head end of the cigar, while the body of the cigar is supported or held by the cigar-clamping fingers 68 69, and said thimble 99 is adjacent to the rotatory frame 67 and has its recess 100 in line with the center of said frame 67. The thimble 99 is detachably secured upon its bed 101, Fig. 2, and at its lower side is provided with the rod 102, Fig. 3, which has a groove 103 at its lower end and is passed downward through a vertical hole in the said bed 101, wherein is provided a pivoted arm 104, whose edge may be pressed into said groove 103 to thereby engage said rod 102 and secure the thimble 99 in place and at the same time to permit of the convenient detachment of the thimble 99 when necessary. When the arm 104 is turned to carry its edge from the rod 102, the latter will be released and the thimble 99 may be elevated from its bed 101.

The recess 100 of the thimble 99 is of known form and utility; but the exterior form of the said thimble 99 is of advantage, in that thereby the loose portion of the wrapper at the head end of the cigar is caused to feed into the recess 100 and around the head end of the cigar in a manner to insure the proper laying of said wrapper around said end of the cigar, whereby irregularities, roughness, tucks, or wrinkles at the head end of the cigar are avoided. The left-hand end of the thimble 99 is at an angle to the central line of the recess 100, as denoted at 105 in Fig. 12. The upper table portion 106 of said thimble at the front of the recess 100 narrows from the wider or right-hand end of said recess toward the left-hand end thereof, this table terminating at the smaller end or apex of the conical recess 100, and said thimble at the front of said table portion 106 inclines downward and outward toward the left, as at 107, Figs. 2, 3, and 12, there being a defined line 108 between the table portion 106 and said portion 107, this line 108 representing an angle or shoulder, over which the loose end of the cigar-wrapper moves on its way from over the curved and inclined portion 107 to and over the table 106. The form of the table 106 and of the portion 107 of the thimble 99 is to guide the loose end of the cigar-wrapper into the recess 100 on the line of the cone represented by the head end of the cigar, the feed of the wrapper to the head end of the cigar being on a curved line extending from the inner edge of the right-hand portion of the table 106 leftward to the inner edge of the left end of said table 106. The loose portion of the tobacco-wrapper at the head end of the cigar is of course soft and pliable and is manually spread over the table 106 and down upon the inclined portion 107 of the thimble 99, and during the operation of the machine this loose portion of the wrapper is drawn over the thimble and into the recess 100 and wrapped around the head end of the cigar.

The thimble 99 is employed in conjunction with means for applying the paste upon the cigar-wrapper, a knife for trimming off that portion of the wrapper which may overhang or extend beyond the outer side 105 of the thimble, means for lightly hammering the wrapper as it is drawn around the cigar, and means for controlling and turning downward the overhanging portion of the wrapper beyond the thimble, and these several operative parts, with the means for actuating the same, will now be described.

*The wrapper-trimming knife.*—The knife for trimming off the surplus portion of the wrapper overhanging the outer angular side 105 of the thimble 99 is numbered 112 and is formed with the several blades 113, Fig. 13, the upper one of which is larger than the lower ones and is adapted at the proper time to make the final cut against the overhanging portion of the wrapper. The knife 112 is pivotally mounted close to the inner portion of the angular side 105 of the thimble 99 and in use is connected with the inner end of the shaft 114, Figs. 2, 5, and 12, which is mounted in bearings 115, supported upon the upper end of the standard 116, which is supported upon the bed of the machine. The shaft 114 may turn in the bearings 115, and between the collar 117 on said shaft and the outer bearing 115 is provided a coiled spring 118, which exerts a tension, pushing the shaft 114 toward the angular side 105 of the thimble 99, so as to keep the knife 112 close against said thimble. The outer end of the shaft 114 is provided with a head or handle 119, and the inner end of the said shaft 114 carries a plate 120, which corresponds in size with the circular shank 121, Fig. 13, of the knife 112 and engages with two small studs (indicated by dotted lines in Fig. 5) the apertures 122 in said shank, so as to thereby effect the turning of the knife 112 with the shaft 114. The inner extremity of the shaft 114 enters the circular aperture 123 in the shank 121 of the knife 112, and hence the said knife is mounted on the inner extremity of the said shaft and is keyed to said shaft by reason of the engagement of the plate 120 with the apertures 122 in the shank of the said knife. One purpose of thus securing the knife 112 with the shaft 114 is to enable the ready detachment of the said knife whenever it may be desired to sharpen the blades 113. The knife 112 may be removed from the machine by simply grasping the head 119 and pulling the shaft 114 outward against the stress of the spring 118, thus carrying the knife 112 from the side of the thimble 99 and permitting the attendant to simply move the knife 112 from the shaft 114 and plate 120, and thereupon the spring 118 will move the shaft 114 back to its former position. (Shown in Fig. 12.) When it is desired to replace the knife 112 into operative position, the attendant will again pull outward on the head 119 of the shaft 114 and, while holding onto the head 119, restore the knife 112 on the inner extremity of the shaft 114 and against the plate 120, and thereupon by releasing the head 119 the spring 118 will again move the shaft 114 toward the thimble 99 and secure the knife 112 against the angular side 105 of said thimble in the position in which it is shown in Fig. 12. The knife 112 has imparted to it through the shaft 114 an oscillatory movement, and the shaft 114 receives its movement from the segment 124, secured on said shaft, and the vertical rack-bar 125, which engages said segment 124 and is caused to have a vertical sliding movement on the vertical guide-rod 126 from the cam 127, Figs. 1, 5, 8, 32, and 33, through the medium of the lever-arm 128, whose front, Fig. 5, is pivotally secured to the lug 129, extending rearward from the vertical sleeve 130, which is integral with the said rack-bar 125 and is directly guided on the vertical rod 126. The rear end of the lever-arm 128 is mounted on the short shaft 131 and carries between the upturned lugs 132 the pivoted arm 133, whose upper end carries a roller 134 in position to be engaged by that portion of the cam-wheel 127 which contains the series of projections 135, these projections acting on the arm 133 and causing the several blades of the knife 112 to make individual cuts through the overhanging portion of the tobacco-leaf. That part of the cam 127 which contains the projections 135 protrudes outward beyond the remaining periphery of the cam-wheel 127, and when this portion (without regard to the projections 135) acts against the arm 133, connected with the lever-arm 128, it will force the arm 133 rearward and elevate the front end of the arm 128, with the result of causing the sleeve 130 and rack-bar 125 to move upward, and this upward movement of the rack-bar 125 effects, through the segment 124, the turning frontward of the shaft 114, which shaft is thus enabled to turn the knife 112 and cause the blades of the latter to cut downward through the overhanging portion of the tobacco-leaf. While the knife 112 is thus being turned downward against the tobacco-leaf the projections 135 on the cam-wheel 127 cause the blades 113 of the said knife 112 to make individual thrusts or cuts into said leaf, the final cut being made by the longer blade 113 of said knife. The arm 133 is adjustable with respect to the cam-wheel 127 by means of the set-screw 136, Figs. 1 and 5, which extends through the sleeve 137 and bears at its lower end against the hub at the rear end of the lever-arm 128. By moving the screw 136 downward through the sleeve 137 the upper end of the arm 133 will be forced closer against the cam 127 and by moving the screw 136 upward through the sleeve 137 the upper end of the arm 133 will be moved outward from the periphery of the cam 127, and by this adjustment of the screw 136 I may regulate to some extent the action of the knife 112. The cam 127 through its portion containing the projections 135 effects the elevation of the front end of the lever-arm and the turning downward of the blades of the knife 122 to cut through the tobacco-leaf, and the restoration of the arm 128, rack-bar 125, and knife 112 to their initial normal position is effected by the pin 138, which projects from the side of the cam 127, and after the cutting by the knife 112 has been performed passes into contact with the upper edge of the lever-arm 128 and pushes said arm 128 downward, thereby causing the rack-bar 125 to descend on the guide-rod 126 and effect the reversal of the movement of the segment 124, shaft 114, and knife 112, the knife 112 being thus restored to its upper normal position. (Shown in Fig. 5.) The cam 127 is shown by dotted lines in its normal at-rest position in Fig. 5, and it will be observed from said figure that very soon after the driving-shaft 31 starts in motion the projections 135 of said cam will reach the roller 134 of the arm 133, connected with the lever-arm 128; but it is to be understood that prior to the starting of the driving-shaft 31 in motion the cigar will be placed on the lower section 56 of the rotatory frame 67 and have its head end introduced into the recess 100 of the thimble 99, the loose projecting portion of the wrapper at the said head end of the cigar being placed upon the upper front surface of the said thimble. Thereupon the driving-shaft 31 is started in motion, and prior to the projections 135 of the cam 127 reaching the roller 134, connected through the arm 133 with the lever-arm 128, the cam 86 will permit the spring 85 to close the cap-section 57 and frame-section 55 downward around the cigar, and the clamping-fingers 68 69 will also therefore, prior to the cam 127 affecting the lever-arm 128, close upon the cigar. Thus during the first part of the rotation of the main driving-shaft 31 the cam 127 will perform no function, but very soon thereafter that portion of the cam 127 having the projections 135 will reach the roller 134, connected with the lever-arm 128, and effect the elevation of the rack-bar 125 and the turning downward of the blades of the knife 112, the projections 135, as above described, causing said blades to make distinct thrusts through the tobacco-leaf, the distance between said projections 135 governing the time between the thrusts of said blades.

*Paste-nozzle and hammer.*—The means for applying the paste upon the cigar-wrapper at the thimble 99 is a hinged nozzle 139, to which the paste is supplied from the cylindrical reservoir, (shown in detail in Figs. 14, 15, and 16,) and which will be hereinafter fully described. The cylindrical paste-reservoir is numbered 140 and is connected with the nozzle 139 by means of a flexible tube 141, through which the paste in limited quantities is expressed and caused to issue through the lower contracted end 142 of the nozzle 139 to and upon the cigar-wrapper. The nozzle 139 is mounted upon the pin 143, which is secured in a horizontal sleeve 144, Fig. 1, carried at the upper end of the standard 145, extending upward (for convenience) from the thimble 99, the said standard 145 serving simply to support the hinged nozzle 139 at a suitable elevation. The coiled spring 146, Figs. 1 and 2, is provided on the outer projecting portion of the pin 143 to exert a normal tension to turn the nozzle 139 downward toward the thimble 99, so that the lower contracted end 142 of said nozzle will close a portion of the recess 100 in said thimble and reach the cigar-wrapper at the head end of the cigar. The nozzle 139 is by means of the spring 146 normally pressed downward, and the said spring is controlled and the movement of the said nozzle 139 is regulated by means of a cam 147, Figs. 1, 5, 29, and 30, which is mounted upon the driving-shaft 31 and coöperates with the lever-arm 148, hung from the pin or shaft 131 at the rear side of the machine, the said arm 148 extending frontward below the driving-shaft 31, and being connected by a link 149, Fig. 5, with an arm 150, which extends rearward and normally slightly downward from the nozzle 139.

The lever-arm 148 has a projection 151, Fig. 5, which is directly below the periphery of the cam 147 and is acted upon by the irregularities of the said periphery. The spring 146, which normally tends to turn the paste-nozzle 139 downward, also has the effect of pulling upward on the link 149, and thereby keeping the projection 151 of the lever-arm 148 close against the periphery of the cam 147, whereby all irregularities in the said periphery of said cam are enabled to act upon the said lever-arm 148 and the paste-nozzle 139 connected therewith. When the parts of the machine are in their normal at-rest condition, the paste-nozzle 139 will be in its upper position, and the smooth surface 152 of the cam 147 will be upon the projection 151 of the lever-arm 148, and upon the starting of the machine in motion the smooth surface 152 of the cam 147 will at the point 153 pass from off the said projection 151, and the said projection will under the action of the spring 146 pass inward to the smaller diameter of the cam 147 adjacent to the said point 153, this permitting the spring 146 to close the nozzle 139 downward to the thimble 99, where it will partly close the recess 100. The continued rotation of the driving-shaft 31 and cam 147 will then cause the toothed surface 154 of said cam to pass over the projection 151 of the lever-arm 148, with the effect of causing a vibratory motion in said lever-arm 148 and the communication of said vibratory motion through the link 149 to the paste-nozzle 139, thereby causing the lower contracted end 142 of the said paste-nozzle to rapidly hammer the tobacco-wrapper as it is drawn around the head end of the cigar then in the thimble 99. The hammering of the wrapper at the head end of the cigar materially aids in imparting a uniform finish to the cigar and the prevention of any bulging of the wrapper thereon. When the nozzle 139 is in its lower position, the paste is expressed from the same in limited quantities. While the toothed portion 154 of the cam 147 is passing over the projection 151 of the lever-arm 148 the hammering action by the contracted end 142 of the paste-nozzle 139 will continue, and after the said toothed portion 154 of said cam 147 leaves the projection 151 the smooth regular surface of the cam 147 will ride against the said projection 151 and retain the lever-arm 148 stationary with the paste-nozzle 139 in its lower position, said paste-nozzle 139 thus remaining stationary during the latter part of the rotation of the cigar in the thimble 99. After the cigar has been rotated sufficiently for the completion of its head end the greater projecting portion of said cam 147 will pass against the projection 151 of the lever-arm 148 and drive said lever-arm downward, and thereby through the link 149 effect the elevation of the paste-nozzle 139 to its normal position free of the thimble 99.

The forcing downward of the lever-arm 148 by the projecting portion 152 of the cam 147 overcomes the stress of the spring 146 and permits the link 149, by pulling downward on the arm 150, to elevate the lower projecting portion 142 of the nozzle 139 from the thimble 99. When the portion 142 of the nozzle 139 is in its lower position, it substantially closes the outer end of the recess 100 of the thimble 99, and when the said portion 142 of the paste-nozzle is in its upper position it leaves the recess 100 fully exposed to admit of the introduction therein of the head end of the cigar.

It has been described before that the paste is expressed through the contracted portion 142 of the paste-nozzle 139 when said portion 142 is at its lower position, and it is obvious that when the nozzle 139 has been turned to its upper position the paste should not be caused to pass through the same. The paste is therefore supplied to the nozzle 139 by an intermittent action and only at a time when the nozzle 139 is in its lower position.

The action of the contracted portion 142 of the paste-nozzle in hammering the wrapper as it is drawn around the cigar may be adjusted and controlled by means of a stop-screw 155, (see Fig. 5,) which passes through the body of said nozzle 139 and is adapted when said nozzle is in its lower position to contact with a stop-lug 156 on the rear part of the thimble 99, as shown in Figs. 2, 3, and 12. During the hammering action of the nozzle 139 the point of the screw 155 contacts with the said stop-lug 156, and hence the contracted end 142 of the said nozzle 139 will not become bruised or extend downward unduly at any time. The screw 155 may be adjusted to regulate the extent to which the contracted end 142 of the nozzle 139 shall move downward, and hence said screw 155 will determine the strength of the blow with which the said contracted end 142 of the nozzle shall strike the cigar-head, and the said screw 155 by its adjustment may also determine the amount of space which should be left between the lower end of the contracted portion 142 of the nozzle 139 and the upper surface of the thimble 99 when said nozzle is in its lower position, it being necessary that some space be left between the upper surface of the thimble 99 and the lower edge of the contracted end 142 of the paste-nozzle 139 in order that the projecting portion of the tobacco-leaf may properly feed inward to the recess 100.

It will be observed on reference to Fig. 5 that there are certain blank spaces left between the projections 154 of the cam 147. The projections 154 of the said cam 147 effect the hammering of the cigar-wrapper through the medium of the contracted end 142, and the said spaces 157, intermediate said projections, are provided to allow the paste-nozzle to remain at rest during those periods in which the several blades of the knife 112 are making their thrusts through the tobacco-leaf overhanging the angular side of the thimble 99. The blank spaces 157 of the cam 147 are therefore arranged with respect to the projections 135 of the cam 127 so that at the time that the several projections 135 are respectively acting on the knife 112 the spaces 157 of the cam 147 will allow the paste-nozzle 139 to remain at rest, these intervals at which the paste-nozzle may remain at rest to provide for the cutting action of the knife 112 being of course very brief and their object being to enable the paste-nozzle to aid in holding the cigar firmly in the conical recess 100 while the blades of the knife 112 are cutting into the wrapper. The cam-wheel 147 is made in two pieces, as shown in Figs. 29 and 31, the piece having the projections 154 being of steel and secured to the other piece, which may be of cast-iron.

*The paste-reservoir and its coöperating parts.*—The action of the nozzle 139 in supplying paste to the wrapper at the head end of the cigar and in hammering the wrapper at said end of the cigar having been described, it is appropriate that the means for feeding the paste to said nozzle 139 be here described.

The paste in bulk is supplied to the cylindrical reservoir 140 and is expressed from the same through the tube 141 to the nozzle 139, said paste passing through the latter to the cigar-wrapper. The details of the paste-reservoir 140 and its coöperating parts are more clearly illustrated in Figs. 1, 4, 14, 15, and 16. The cylindrical reservoir 140 has upon its forward end, through which it is filled, the screw-cap 160, which terminates in a contracted spout 161, which receives one end of the flexible paste-tube 141. The rear end of the cylinder 140 is closed, as shown in Fig. 14, and within the cylinder 140 is provided a suitable piston 162, connected with a threaded piston-rod 163, the latter extending through the rear end of said cylinder 140 and having along one side a continuous groove 164, Fig. 14, into which the point of a screw 165 passes, said screw serving to prevent the piston-rod 163 from having any rotation without interfering with said rod, having imparted to it a direct longitudinal motion. The screw 165 passes through a thickened portion of the metal at the rear end of the cylinder 140, and said cylinder is rigidly, though detachably, mounted within the sleeve 166, cast upon the upper end of the standard 167, which is fastened by screws or otherwise upon the bed-plate 30. The cylinder 140 is locked in position within the sleeve 166 by means of an arm 168, carried by the cylinder, and a hinged catch 169, which turns downward against the outer side of the said arm 168 after the latter by an axial motion of the cylinder 140 has been turned into a recess formed in the lug 170 of the sleeve 166. The hinged catch 169 is secured by a screw to the side of a lug cast on the upper side of the aforesaid sleeve 166. When the hinged catch 169 is turned upward, the cylinder 140 by an axial motion to the right will carry its arm 168 from the lug 170, and the said cylinder 140 may be drawn directly outward from the sleeve 166, so as to be refilled with paste upon the removal of the screw-cap 160.

Surrounding the rear portion of the piston-rod 163 I provide a clutch mechanism for imparting to said rod an intermittent direct forward motion, so as to move the piston 162 against the paste contained in the front portion of the cylindrical reservoir 140, and this clutch mechanism comprises the wheel 171 and plate 172, said wheel 171 having the cylindrical hub 173, Fig. 14, which is mounted in the bearing 174 on the upper end of the cast standard 167, being held therein by the cap 175, which is fastened by screws and contains the screw 176, by which a tension may be placed upon the hub 173, so as to prevent any undue rotation of said hub, but without interfering with the proper movement of the hub during the rotation by intermittent movements of the wheel 171. The plate 172 fits against the rim of the wheel 171, and while being mounted upon the tubular hub 173 of said wheel itself has a tubular hub 177, which is in the form of an eccentric, as shown in Fig. 15, and has placed upon it the dog 178, the latter at its outer portion by means of a spring 179, Fig. 16, being connected with the face of the plate 172 and the outer edges of the said dog 178 engaging the inner surface of the rim of the wheel 171. The plate 172 is given simply an oscillatory motion on the tubular hub 173 and does not, therefore, at any time make a complete rotation. During the oscillatory motion of the plate 172 the dog 178 is caused to impart by intermittent motions a rotary motion to the wheel 171, the wheel 171, plate 172, and dog 178 constituting a clutch mechanism. When the plate 172 is given a partial rotary motion in one direction, the dog 178 will slip over the surfaces of the rim of the wheel 171 without imparting any motion to said wheel, and when the plate 172 is given a partial rotary motion in the other direction the dog 178 will engage said rim of said wheel and cause said wheel to have a rotary motion corresponding in extent with that of the plate 172, the dog 178 then locking the wheel 171 and plate 172 together. When the plate 172 is moved to carry the outer portion of the dog 178 in a direction toward the spring 179, (shown in Fig. 16,) said dog will not engage the rim of the wheel 171; but when the motion of said plate 172 is reversed the eccentricity of the tubular hub 177 will cause said dog 178 to lock against the rim of the wheel 171 and tie said wheel and said plate 172 together. Thus while the plate 172 has simply an oscillatory motion on the tubular hub 173 the wheel 171 will be compelled to rotate by successive or intermittent movements. The movement of the wheel 171 is, by the mechanism presently to be described, imparted to the piston-rod 163, the latter having, as above described, simply a direct longitudinal motion and no rotary motion.

I will first describe the means for imparting to the plate 172 its oscillatory motion and then the means by which the rotary motion of the wheel 171 is caused to impart to the piston-rod 163 its direct horizontal motion.

The plate 172 is provided at opposite sides with the apertured ears 180 and 181, and the ear 181 is connected with a coiled spring 182, which extends downward and is secured to the side of the cast standard 167, Fig. 4. This spring is under a constant tension, pulling downward on the ear 181, and consequently has a tendency to turn the plate 172 toward that side of the cast standard 167 to which the spring is secured. The ear 180 of the plate 172 is connected by a link-rod 183 with the pivoted lever 184, which is mounted upon the pin 131, Figs. 1 and 4, and has a forwardly-extending arm 185, which is engaged by the cam 186, Figs. 1, 32, and 33, located on the main driving-shaft 31. During each revolution of the main driving-shaft 31 the cam 186, acting against the arm 185 of the pivoted lever 184, operates, when the paste-nozzle 139 is in its lower position, to pull the rod 183 downward, and thereby to turn the plate 172, against the stress of the spring 182, toward that side of the cast standard 167 at which said rod 183 is located, and during the said rotation of the main driving-shaft 31 the cam 186 permits the spring 182 to restore the plate 172 to its normal position or that occupied before the said cam 186 exerted its influence in pulling downward on the rod 183. Thus during each revolution of the driving-shaft 31 the motion of the plate 172 is caused first in one direction by the downward pull of the rod 183 and then in the reverse direction by the downward pull of the spring 182 while the latter is restoring the plate 172 to its normal position.

The means for imparting the oscillatory motion to the plate 172 having been described and it having been hereinbefore described how the motion of the plate 172 is caused to impart an intermittent rotary motion to the wheel 171, I will now describe the means by which the motion of the wheel 171 is caused to impart a direct horizontal motion to the piston-rod 163. Upon the front face of the wheel 171 are provided the two parallel blocks 187 187, Figs. 4, 14, and 16, and between these two blocks 187 is confined the nut 188, which is on the threaded stem 163. When the wheel 171 is rotated, the blocks 187 187 engage and rotate the nut 188, and since the latter is prevented from traveling longitudinally of the stem 163 it is obvious that the stem 163 must travel through it, and thus it is that the stem 163 and piston 162 receive their longitudinal movement to express the paste from the reservoir 140. Since said rod 163 is held against rotation by means of the screw 165, the said rod is compelled and only permitted to have a direct traveling motion, the nut 188 forcing said rod to travel forward.

After the paste has been exhausted from the cylindrical reservoir 140 said reservoir will be freed from the sleeve 166, and the cylinder 140, with its rod 163 and nut 188, may be immediately withdrawn from the machine and said cylinder 140 be then recharged with paste and restored to the sleeve 166, the piston-rod 163 passing directly through the tubular sleeve 173. Upon the return of the rod 163 through the sleeve 173 the operator will see that the nut 188 passes between the blocks 187 187 and then secure the cylinder 140 by means of the latch 169.

The wheel 171 is by the clutch mechanism, as hereinbefore described, given an intermittent rotary motion and through the nut 188 imparts a direct intermittent travel to the piston-rod 163 and piston 162, with the result that the piston 162 will express in limited quantities the paste through the flexible tube 141 and into and through the lower contracted portion 142 of the nozzle 139.

The motion of the plate 172 in one direction is of course limited by the amount of throw which the cam 186 imparts through the rod 183 to the same, and the motion of plate 172 in the reverse direction under the action of the spring 182 is limited by the contact of the stop-plate 190 against the stop-screw 191, secured in the lug 192 on the cap 175, located over the tubular bearing 174 for the wheel 171. The screw 191 is provided in order that the stop checking the throw of the plate 172 under the action of the spring 182 may be adjustable, thereby to regulate the extent of movement the plate 172 shall have, and consequently the extent of movement which shall be imparted to the piston-rod 163 and piston 162 during each of the intermittent movements of the wheel 171.

*The means for controlling and turning downward the portion of the cigar-wrapper overhanging the outer edge of the thimble.*—The means for controlling and turning downward that portion of the cigar-wrapper which may overhang the angular side 105 of the thimble 99 consists of the arm 192, having a broadened outer end or plate 193, carrying at its edge adjacent to the thimble 99 a strip of rubber or other flexible material 194, Figs. 1 and 6, together with suitable means operated from the main driving-shaft 31 for imparting to said arm 192 the proper movements for enabling the strip of flexible material 194 to act upon the overhanging portion of the cigar-wrapper. The arm 192 is secured to a sleeve 195, Figs. 6 and 7, which is mounted to slide vertically and turn axially upon a rod 196, and said sleeve 195, carrying the arm 192, is given an upward tension under the force of the spring 197, coiled around the lower end of said rod. The sleeve 195 at one side and near its lower end carries a roller 198, which engages and is adapted to ride upon a spiral cam 199. The spring 197 normally keeps the sleeve 195 elevated, with the roller 198 at the top of the cam 199, as shown in Fig. 6, the initial position of the arm 192 then being that shown in Fig. 1.

The sleeve 195 and arm 192 are caused to move downward on the rod 196, compressing and winding up the spring 197, by means of the bell-crank lever-arm 200, which engages the sleeve 195, Fig. 6, and is itself engaged by the cam 201, Figs. 27 and 28, on the driving-shaft 31. The cam 201, acting on the arm 200, will press the sleeve 195 and arm 192 downward, and at the same time the cam 199 will act to turn said sleeve 195 spirally, so that said sleeve will carry the arm 192 from the position in which it is shown in Fig. 1 inward, over, and downward against that portion of the tobacco-leaf which may overhang the angular side 105 of the thimble 99. The arm 192, carrying the flexible strip or blade 194, is normally higher than the thimble 99 and descends while turning inward on a spiral line governed by the cam 199, and when thus descending the flexible strip 194 wipes downward against the overhanging portion of the leaf and brushes it downward preparatory to the descent of the knife 112 against the same. While the projecting portion of the cam 201 is leaving the arm 200, the spring 197 elevates the sleeve 195, and at the same time, being connected at its upper end therewith, Fig. 7, causes said sleeve to turn axially and the roller 198 to ride up the cam 199, whereby said sleeve and the arm 192 become restored to their normal initial position. (Shown in Fig. 1.) The spring 197 is connected at its upper end to the sleeve 195 and at its lower end to the rigid base, Fig. 7, and hence said spring becomes wound up as well as compressed during the axial and down motion of the sleeve 195.

I regard the strip of flexible material 194 at the outer end of the arm 192 as of importance, since thereby the said arm 192 may with great freedom and closeness of contact act upon that portion of the cigar-wrapper which may be overhanging the edge of the thimble 99 and without any danger of injury to or straining the wrapper or pulling it in irregular lines from over the edge of said thimble. In the absence of the strip of flexible material 194 the then rigid edge of the arm 192 would have to be nicely adjusted with respect to the thimble 99 and would have to be sufficiently removed from said thimble not to crush or bind against the overhanging portion of the cigar-wrapper. The flexible strip 194 on the end of the arm 192 for contact with the cigar-wrapper enables the direct engagement with the wrapper, and consequently the wrapper is placed under positive, though yielding, control and is correctly managed without injury to itself or interference with the required duties of the knife 112.

*Means for withdrawing the cigar from the thimble 99 and frame 67 and trimming the tuck end of same.*—The means for withdrawing the cigar after the completion of the head of same and trimming the tuck end of the cigar comprise the cutters or knives 205 and 206, together with the mechanism for operating said knives, Figs. 1, 2, 11, 17, and 20.

The knives 205 and 206 are pivotally mounted upon the bolt or pin 207, Figs. 11 and 20, which is secured within the frontwardly-projecting lug 208, which is integral with the slide-carriage 209, mounted at its rear bifurcated end 210 upon the sleeve 211, which is adapted to slide upon the driving-shaft 31. The front portion of the carriage 209 is in the form of a sleeve 212, and this sleeve is mounted upon an inner sleeve 213, which is mounted upon the oscillatory shaft 64 and is adapted to have a sliding motion on said shaft. The sleeve 213 is by means of a key 214, Fig. 11, and groove 215, Fig. 2, secured to the shaft 64, so as to turn therewith in the manner hereinafter described. The knives 205 and 206 are secured to bell-crank levers 216 and 217, respectively, Fig. 11, said bell-crank levers being centered upon the pin or bolt 207 and also pivotally secured at their vertical arms to the transversely-slidable bifurcated plate 218. The sliding motion of the plate 218, operating through the bell-crank levers 216 and 217, moves the knives 205 and 206 to their closed position (shown in Fig. 11 by full lines) or opens said knives from one another to the dotted position in which they are illustrated in Fig. 11. The form of the transversely-slidable plate 218 is clearly indicated in Fig. 11, and this plate at its rear end is bifurcated and rests within a groove in the sleeve 211, as shown in Fig. 20. The plate 218 thus travels with the carriage 209 and in addition is adapted to have a transverse sliding motion for the purpose of opening and closing the knives 205 and 206. The plate 218 is normally held in its rear position (shown by full lines in Figs. 11 and 20) by means of the coiled spring 220, which is inclosed within the carriage 209 and presses rearward against the pin 221, secured to the plate 218 and projecting inward into the central recess of the carriage 209. The spring 220, pressing against the pin 221, pushes said pin and the plate 218 rearward, with the normal effect of closing the knives 205 206 toward one another. The plate 218 is pressed forward at the proper time against the stress of the spring 220 by means of the cam 222, Figs. 20, 40, and 41, secured on the left-hand end of the sleeve 213, in position when said sleeve is turned by the turning of the shaft 64 to move against the pin 223, connected with the aforesaid plate 218, said cam 222 when turning forward being adapted to move against the said pin 223 and push the plate 218 forward, with the result of causing said plate to act, through the bell-crank levers 216 and 217, to open the knives 205 206 from one another to the position in which they are illustrated by dotted lines in Fig. 11. Thus the spring 220, acting on the plate 218, exerts a normal yielding tension to close the knives 205 206 toward one another, and said knives are at the proper time positively opened against the stress of said spring 220 by means of the cam 222.

I will first describe the means for imparting to the carriage 209 a traveling or sliding motion toward and from the cigar-clamping fingers 68 and 69 and then describe the means for operating the shaft 64 and through said shaft the cam 222. The traveling motion imparted to the carriage 209 and the parts carried thereby is derived from the main driving-shaft 31 through the grooved cam 224 thereon, Figs. 1, 2, 42, and 43, which engages the upper end of a short arm 225, Figs. 2, 11, and 17, extending upward from a rock-shaft 226, to which is secured the upwardly-extending lever-arm 227, between ears at the upper end of which is secured the horizontal longitudinally-extending rod 228, whose left-hand end is held within a sleeve 229, pivotally secured to the upper side of the carriage 209, as shown in Figs. 1 and 2, the said sleeve 229 being equipped with a finger-screw 230, by which the rod 228 may be secured within said sleeve 229. The rotation of the driving-shaft 31 and cam 224 will impart, through the short arm 225, a rocking motion to the shaft 226, and this shaft 226 will impart an oscillatory motion to the lever-arm 227, carrying the rod 228, with the result that the rod 228 will move the carriage 209 and the parts carried thereby first toward the thimble 99 and then toward the right from said thimble.

The means for actuating the shaft 64 to operate the knives 205 and 206 through the cam 222 are illustrated in Figs. 1, 2, 17, 18, and 19, in which it may be seen that upon the end of the driving-shaft 31 is secured a cam 231 (also shown in Figs. 38 and 39) and that upon the end of the shaft 64 is secured the sleeve 232, having the two crank-arms 233 and 234, while to the end of the crank-arm 234 is pivotally secured the rod 235, which contains the slot 236, Fig. 19, to straddle the driving-shaft 31 and at its rear end is provided with the roller 237, in position to be engaged by the periphery of the cam 231. The crank-arm 233 carries the roller 238, which at the proper time is acted upon by the side projection 239 of the said cam 231, said projection 239 acting exclusively on the crank-arm 233 and the cam 231 acting exclusively through the arm 235 on the crank-arm 234, the projection 239 acting through the crank-arm 233 to turn the shaft 64 in one direction, and the cam 231 acting through the arm 235 on the crank-arm 234 to turn the shaft 64 in the reverse direction when the body of a cigar is between the knives 205 206.

When the knives 205 206 are at their extreme outward position to the right, (shown in Fig. 1,) they will be closed together in the condition in which they are shown in Fig. 11, and the crank-arms 233 and 234 and cam 231 will be in their normal initial position. (Shown in Fig. 17.) Upon the starting of the machine in operation the driving-shaft 31 and cam 224 will operate, through the arm 225, rock-shaft 226, lever-arm 227, and rod 228, to move the carriage 209 with the knives 205 206 toward the left until said carriage reaches a predetermined position, governed by the length of the cigar being manufactured. During the travel toward the left of the carriage 209 through the instrumentality of the cam 224 and intermediate devices the cam 231, turning toward the rear, Fig. 17, will carry its curved periphery against the roller 237 on the end of the arm 235, with the result of pushing said arm 235 rearward and with the crank-arm 234 turning the shaft 64 a definite distance toward the front. This turning motion of the shaft 64 toward the front results in the cam 222 being turned frontward against the pin 223 of the plate 218 to slide said plate frontward, which motion of said plate has the effect of opening the knives 205 206 from one another to the condition in which they are illustrated by dotted lines in Fig. 11. The knives 205 206 remain in their open position during all of the time that the periphery of the cam 231 is riding against the roller 237 of the arm 235, and hence during the travel toward the left of the carriage 209 the knives 205 206, being open from one another, will be compelled to pass upon the tuck end of the cigar projecting outward from the clamp-fingers 68 69. After the periphery of the cam 231 passes beyond the roller 237, carried by the sliding arm 235, the spring 240, Fig. 1, will reverse the motion of the shaft 64 and draw the arm 235 as nearly to the position in which it is shown in Fig. 17 as the thickness of the cigar then between the knives 205 206 will permit, the full reverse motion of the shaft 64 being prevented by reason of this thickness of the cigar between the knives 205 206 and the fact that the spring 220, then acting against the plate 218, is insufficient to cause said knives 205 206 to cut through the cigar. When the periphery of the cam 231 passes from the roller 237 of the arm 235, the spring 240 acts to reverse the motion of the shaft 64 and draw said arm 235 in a direction toward the driving-shaft 31, and this reverse motion of the shaft 64 effects the turning away of the cam 222 from the pin 223 of the plate 218. The cam 222, moving from the pin 223 of the plate 218, leaves the said plate 218 under the unrestrained stress of the spring 220, which is sufficient to cause said knives 205 206 simply to pinch the cigar-body without cutting through the same. While the knives 205 206 are thus pinching the cigar under the action of the spring 220, the cam 224 will return the carriage 209 to its position to the right, (shown in Fig. 1,) the knives 205 206 maintaining their pinching grip upon the cigar and drawing the same endwise from the then open rotatory frame 67 and clamping-fingers 68 69. Upon the arrival of the carriage 209, with the knives 205 and 206 still pinching the cigar, to its initial position the projection 239 on the cam 231 will pass against the roller 238 at the end of the crank-arm 233 and by pressing downward on the said arm 233 will cause the shaft 64 to make a limited rotary turn for the purpose of compelling the cam 222 to press against the wheel 241, connected with the plate 218, and drive said plate rearward, so as to compel the closing together of the knives 205 206 and the cutting off of the tuck end of the cigar by said knives. Thus the knives 205 206 when the carriage 209 is in its initial position are closed together in the condition in which they are shown by full lines in Fig. 11. When the machine is started in motion and the cigar is held between the clamping-fingers 68 and 69, the cam 224 will operate, through the intermediate mechanism, to move the carriage 209, carrying the knives 205 206 toward the left, and at such time the cam 231 on the end of the driving-shaft 31 will operate, through the arm 235 and crank-arm 234, to turn the shaft 64 toward the front, so that the cam 222 may act upon the pin 223 of the plate 218 and move said plate forward for the purpose of opening the knives 205 206 to the position in which they are shown in Fig. 11 by dotted lines, whereby said knives will be enabled to pass upon the tuck end of the cigar projecting toward them from the clamping-fingers 68 69. When the rotation of the cigar to complete its head end has ceased, the cam 231 will leave the arm 235 and allow the spring 240 to reverse the motion of the shaft 64, whereby the cam 222 will be released from the plate 218, and the spring 220 will act upon said plate 218 and move the same rearward to the extent permitted by the thickness of the cigar then being pinched (owing to the tension of the said spring 220) by the knives 205 and 206, and thereupon the cam 224 will restore the carriage 209 to its initial position, said carriage while moving toward the right withdrawing the cigar from the thimble 99 and from between the then open fingers 68 69, and upon the arrival of the carriage 209 at its initial position the projection 239 on the cam 231, Fig. 17, will depress the outer end of the crank-arm 233 and turn the shaft 64 toward the rear for the purpose of compelling the cam 222, acting against the roller 241, to drive the plate 218 rearward, and thereby effect the closing together of the knives 205 206, said knives when thus closing together completely trimming off the tuck end of the cigar and releasing the latter. The knives 205 206 thus perform two functions, one being to draw the cigar endwise from the thimble 99 and the other being to trim off the tuck end of the cigar, whereby the latter becomes completed.

It is desirable that cigars varying in length may have their heads formed by means of the machine made the subject of this application, and therefore I provide the adjustable rod 228 and place index-marks upon the same, as shown in Fig. 1, in order that the operator may be guided in adjusting the carriage 209 in accordance with the length of the cigars being made. When short cigars are being manufactured, the carriage 209 will be secured toward the left-hand end of the aforesaid rod 228, so that the knives 205 206 may reach and properly trim the tuck end of the cigars, and when, for instance, longer cigars are being made the carriage 209 will be moved toward the right and secured to the rod 228 in order that during the inward-advancing motion of the carriage 209 the knives 205 206 shall not unduly pass upon the tuck end of the cigars. By means of the screw 230 the carriage 209 may be adjusted upon the shafts 31 and 64 and rod 228 to any position desired and the travel of the carriage controlled.

*Operation.*—The operation of the machine made the subject of this application will be fully understood from the description hereinbefore presented without further detailed explanation. The driving-shaft 31 makes one complete revolution and then automatically stops and does not start again until the operator releases the hooked arm or pawl 33 from the shoulder 48 of the plate 36, constituting a part of the main clutch mechanism at the left-hand end of the said driving-shaft. During one revolution of the driving-shaft 31 the cigar then held between the clamping-fingers 68 69 is caused to make several revolutions and the motion of the one driving-shaft 31 is communicated to all of the cams for actuating the several parts of the machine. When the machine is in its normal at-rest position, the paste-nozzle 139 is in its upper position, (shown in Fig. 5,) the upper section 57 of the cigar-frame casing and the upper section 55 of the rotatory frame 67 are in their elevated or open position, the knives 205 and 206 are in their closed position, with the carriage 209 in stationary position outward toward the right, the wrapper controlling and folding arm 192 is at its outward position, (shown in Fig. 1,) and the wrapper-trimming knife 112 is in its upper position, with its cutters or blades elevated above the end of the thimble 99, and when the said parts are thus in their normal at-rest position the operator will place the cigar upon the lower section 56 of the frame 67, with the head end of the cigar in the recess 100 of the thimble 99, and see that the loose portion of the wrapper at the head end of the cigar is extended frontward over the said thimble 99, with the longitudinally-projecting portion of said wrapper overhanging the angular edge 105 of the said thimble. The cigar being thus in position, the operator will free the pawl 33 from the clutch-plate 36 and allow the motion of the belt-wheel 32 to be imparted to the main driving-shaft 31. This having been done, the upper section 57 of the rotatory-frame casing and the upper half 55 of the said rotatory frame numbered 67 will close downward and the cigar-clamping fingers 68 69 will close toward one another and upon the body of the cigar, whereupon the folding-arm 192, with its blade 194, will turn inward and downward along the angular side 105 of the thimble 99 for the purpose of folding the projecting overhanging portion of the leaf downward, and at this time the paste-nozzle 139 will turn downward to substantially close the upper front portion of the recess 100 in the thimble 99, the knife 112 will turn frontward and downward to trim the overhanging portion of the tobacco-wrapper, and the rotatory frame 67, carrying the cigar, will rotate and the loose portion of the tobacco-leaf will be drawn into the recess 100 of the thimble and around the head end of the cigar. The paste-nozzle 139 when in its lower position will perform its hammering action while supplying the paste and the paste will be properly supplied through the flexible tube 141 to said paste-nozzle. During the continued rotation of the driving-shaft 31 the cigar will be given a rather rapid rotation, the paste-nozzle 139 will remain closed down and stationary for a given length of time, the knives 205 and 206 will advance and pinch upon the tuck end of the cigar, and the arm 192 will move frontward and upward to its normal position. (Shown in Fig. 1.) The further continued rotation of the main driving-shaft 31 will then effect the movement upward of the upper section 57 and upper half 55 of the casing and rotatory frame, respectively, to the position shown in Fig. 4, the separation of the clamp-fingers 68 and 69 from the cigar and the upward movement of the paste-nozzle 139, and thereupon the carriage 209 will move outward to the right, carrying the cigar with it, the latter being pinched between the knives 205 206, and upon the arrival of the carriage 209 at its initial position the said knives 205 206 will be forced by the cam 222 to cut entirely through the cigar, thereby trimming off the tuck end of the same. The driving-shaft 31 will thereupon have completed its one rotation and left all of the parts of the machine in their normal at-rest condition. The operator will then introduce another cigar to the thimble 99 and upon the lower half 56 of the rotatory frame 67 and again trip the pawl 33 for restarting the machine. This operation will be continued as long as necessary, each rotation of the main driving-shaft 31, in connection with the parts hereinbefore described, completing a cigar.

The machine made the subject of this application discloses certain features of invention made the subject of an application for Letters Patent of the United States filed by me on June 16, 1900, Serial No. 20,494, for improvements in cigar-making machines, these features pertaining more especially to the rotatory clamp-frame for holding and rotating with the cigar the tuck-cutting knives for withdrawing the cigar in a longitudinal direction from said frame and then trimming the tuck end of same, the means for feeding the paste used for the wrapper at the head end of the cigar, and the flexible strip or blade (in this application numbered 194) for folding downward the portion of the tobacco-wrapper which overhangs the recessed thimble, and hence said features of invention in their broader scope are not claimed in this application in a generic sense, this application being subject to said pending application, Serial No. 20,494.

What I claim as my invention, and desire to secure by Letters Patent, is—

1. In a machine for making cigars, the thimble to receive the head end of the cigar, combined with the rotatory cigar-frame 67 in separable sections and having the gear-teeth, the cigar-clamping fingers secured to and carried by and disposed at the side of said frame, means for opening and closing said frame and fingers, and gearing for rotating said frame and fingers while the cigar is held therein with its head end in said thimble; substantially as set forth.

2. In a machine for making cigars, the thimble having the recess to receive the head end of the cigar, combined with the rotatory cigar-frame 67 in separable sections and having the gear-teeth, the pivoted cigar-clamping fingers secured to and carried by and disposed at the side of said frame, means for closing said frame, the spring for closing said fingers when said frame closes, and gearing for rotating said frame and fingers while the cigar is held therein with its head end in said thimble; substantially as set forth.

3. In a machine for making cigars, the thimble having the recess to receive the head end of the cigar, combined with the rotatory cigar-frame 67 in separable sections and having the gear-teeth, the pivoted cigar-clamping fingers secured to and carried by and disposed at the side of said frame, gearing connecting the shank ends of said fingers to compel uniform motion in said fingers, means for closing said frame and fingers, and gearing for rotating said frame and fingers; substantially as set forth.

4. In a machine for making cigars, the thimble having the recess to receive the head end of the cigar, combined with the rotatory cigar-frame 67 in separable sections and having the gear-teeth, the pivoted cigar-clamping fingers secured to and carried by and disposed at the side of said frame, gearing connecting the shank ends of said fingers to compel uniform motion in said fingers, means for opening and closing said frame, means for opening said fingers when said frame opens, the spring for closing said fingers when said frame closes, and gearing for rotating said frame and fingers; substantially as set forth.

5. In a machine for making cigars, the thimble having the recess to receive the head end of the cigar, combined with the rotatory cigar-frame 67 in separable sections and having the gear-teeth, the pivoted cigar-clamping fingers secured to and carried by and disposed at the side of said frame for closing said frame, the spring for closing said fingers when said frame closes, means connected with the upper section of the said frame for opening said fingers when said section opens upward, and gearing for rotating said frame and fingers; substantially as set forth.

6. In a machine for making cigars, the thimble having the recess to receive the head end of the cigar, combined with the rotatory cigar-frame 67 in separable sections and having the gear-teeth, the cigar-clamping fingers pivotally secured to the lower section of the said frame, gearing connecting the shank ends of the said fingers to compel uniform motion in said fingers, the spring for closing said fingers when said frame closes, means connected with the upper section of said frame for opening said fingers against the stress of the said spring when said upper section opens upward, means for closing said frame, and gearing for rotating said frame and fingers; substantially as set forth.

7. In a machine for making cigars, the thimble having the recess to receive the head end of the cigar, combined with the rotatory clamping-frame 67 in separable sections and having a bore somewhat larger than the diameter of the cigar, the cigar-clamping fingers secured to and carried by and disposed at the side of said frame, and gearing for rotating said frame and fingers; substantially as set forth.

8. In a machine for making cigars, the thimble having the recess to receive the head end of the cigar, combined with the rotatory cigar-frame 67 in separable sections and having the gear-teeth, clamping members carried by said frame for binding against the cigar, means for closing said frame and fingers about the cigar, means for opening said frame and fingers, independent means for locking said frame in its closed condition, and gearing for rotating said frame with said fingers; substantially as set forth.

9. In a machine for making cigars, the thimble having the recess to receive the head end of the cigar, combined with the rotatory frame in separable sections and having the gear-teeth, clamping members carried by said frame for binding against the cigar, means for closing said frame and fingers about the cigar, a latch for locking said frame in its closed position, a cam operable from the driving-shaft of the machine for opening said frame, means operable from the driving-shaft for releasing said latch prior to the opening of said frame, and gearing for rotating said frame and fingers; substantially as set forth.

10. In a machine for making cigars, the thimble to receive the head end of the cigar, the rotatory cigar-frame 67 in separable sections and having the gear-teeth, clamping members carried by said frame for binding against the cigar, the casing in separable sections inclosing said rotatory frame and affording a guideway for the same, the pivoted frame 59 carrying the upper section of said casing and having the rearwardly-projecting arm 87, the cam 86 on the driving-shaft for opening said casing and frame, the spring for closing said casing with said frame, the latch for locking said casing in its closed position, means operable from the driving-shaft for releasing said latch prior to the action of said cam 86 in opening said casing and frame, and gearing for rotating said frame within said casing; substantially as set forth.

11. In a machine for making cigars, the thimble having the recess to receive the head end of the cigar, combined with the rotatory frame 67 in separable sections and having the gear-teeth, the cigar-clamping members carried by said frame, gearing for rotating said frame, an automatic latch for locking said frame in its closed position, means operable from the driving-shaft for releasing said latch to permit the opening of said frame, and gearing for rotating said frame; substantially as set forth.

12. In a machine for making cigars, the thimble having the recess to receive the head end of the cigar, combined with the rotatory cigar-frame 67 in separable sections and having the gear-teeth, the cigar-clamping fingers 68, 69, pivotally secured to the lower section of said frame, the gearing connected with the shank ends of said fingers to compel uniform motion in said fingers, the pin 77 connected with the upper section of said frame and entering the slot 76 in a part of one of said fingers, means for closing said frame, the spring for closing said fingers, and gearing for rotating said frame with said fingers, said pin 77 effecting the opening of said fingers when the upper section of said frame is opened and preventing any undue outward spring action of said fingers from one another when said fingers are closed upon the cigar and in rotation; substantially as set forth.

13. In a machine for making cigars, the thimble having the recess to receive the head end of the cigar, combined with the rotatory cigar-frame 67 in separable sections and having the gear-teeth, cigar-clamping members carried by said frame for binding against the cigar, the casing comprising the upper and lower sections 57, 58 for inclosing said rotatory frame, the pivoted frame 59 carrying the upper section 57 of said casing and having the arm 87, the driving-shaft 31, the cam 86 on said shaft and having the surfaces 91 and 88 to engage said arm 87 for respectively opening said casing-section 57 and maintaining the same in its open position when the machine comes to a rest, a spring for closing said casing-section 57 after the said surface 88 of the cam 86 leaves said arm 87, means for locking said casing in its closed position, and gearing for rotating said frame-sections; substantially as set forth.

14. In a machine for making cigars, the thimble 99 having the recess 100 to receive the head end of the cigar, and means for substantially closing the side of said recess when the head of the cigar is therein, combined with means for rotating the cigar in said recess, said thimble having the table 106, the downwardly and outwardly curved surfaces 107, and the angular outer side 105, to which the surfaces 107 lead; substantially as set forth.

15. In a machine for making cigars, the thimble 99 having the recess 100 to receive the head end of the cigar, the bed supporting said thimble, and the locking-arm 104 secured thereto, combined with the rod 102 secured to the bottom of said thimble and adapted to be passed downward through said bed and having at its lower end the recess 103 to be engaged by said arm 104; substantially as set forth.

16. In a machine for making cigars, the rotatory clamp for holding the cigar, and the thimble having the recess to receive the head end of the cigar, combined with the knife 112 for trimming the wrapper overhanging the edge of the said thimble, the pivoted arm 192 having at its outer end the folder-blade for engaging and folding downward said overhanging portion of the wrapper, means for causing said arm 192 to perform a spiral motion from its outer normal at-rest position inward over the said wrapper and downward against said wrapper, and means for restoring said arm 192 to its former outward at-rest position; substantially as set forth.

17. In a machine for making cigars, the rotatory clamp for holding the cigar, and the thimble having the recess to receive the head end of the cigar, combined with the knife 112 for trimming the wrapper overhanging the edge of the said thimble, the folder-arm 192 having at its outer end the blade for engaging and folding downward said overhanging portion of the wrapper, the sleeve 195 to which said arm is secured, the vertical guide-rod 196 receiving said sleeve, the spiral cam 199 engaging said sleeve 195, the coiled spring 197 engaging said sleeve and being normally under a tension to preserve the contact of the said sleeve with said cam and to turn said folder-arm outward from said thimble, and means operable from the driving-shaft for depressing said sleeve against said spring to cause said sleeve under the influence of the said cam to perform a spiral motion, whereby the blade end of said folder-arm is carried inward and downward along the outer edge of said thimble and is thereafter restored to its normal position by the torsion of said spring; substantially as set forth.

18. In a machine for making cigars, the thimble having the recess to receive the head end of the cigar, and rotatory means for holding the cigar, combined with the paste-cylinder 140, the tubular conveying means leading from said cylinder to said thimble for directing the paste to the cigar-wrapper, the piston 162 within said cylinder, the threaded piston-rod 163 connected with said piston and having a longitudinal groove 164, means for engaging said groove 164 to prevent rotation of the said piston-rod without interfering with the travel of said rod, the wheel 171 having the tubular hub 173 through which said rod passes, the plate 172 mounted upon said tubular hub and itself provided with the eccentric hub 177, the dog 178 mounted on said eccentric hub and adapted to engage, when the plate 172 is moved in one direction, the rim of said wheel 171, means for imparting an oscillatory motion to said plate 172 in order that thereby the dog 178 may impart an intermittent rotary motion to said wheel 171, the blocks 187 secured to said wheel 171, and the nut 188 confined between said blocks 187 and engaging said piston-rod 163, whereby during the intermittent rotary motion of said wheel 171, said blocks and nut may effect a forward travel to said piston-rod and piston for expressing the paste from said cylinder; substantially as set forth.

19. In a machine for making cigars, the thimble having the recess to receive the head end of the cigar, and rotary means for holding the cigar while the head end of the latter is within said recess, combined with the hinged paste nozzle 139 having the lower contracted portion 142 adapted to partly close the upper outer portion of the said recess and leave a space between itself and the adjacent portion of the said thimble for admitting the inward passage of the cigar-wrapper to the head end of the cigar, means for raising and lowering the said paste-nozzle, means for causing said paste-nozzle to hammer the head end of the cigar during the inward passage of the tobacco-leaf, means for regulating the relation of the lower end of the said paste-nozzle to the head end of the cigar so as to control the hammering action of the said nozzle, and means for supplying paste to said nozzle; substantially as set forth.

20. In a machine for making cigars, the thimble having the recess to receive the head end of the cigar, and rotary means for holding the cigar while the head end of the latter is within said recess, combined with the hinged paste-nozzle 139 having the lower contracted portion 142 adapted to partly close the upper outer portion of the said recess and leave a space between itself and the adjacent portion of the said thimble for admitting the inward passage of the cigar-wrapper to the head end of the cigar, means for raising and lowering said paste-nozzle, means for causing said paste-nozzle to hammer the head end of the cigar during the inward passage of the tobacco-leaf, the screw 155 carried by said nozzle 139 for controlling the action of said paste-nozzle in hammering the cigar, the stop 156 to receive the impact of the lower end of the said screw 155, and means for supplying paste to said nozzle; substantially as set forth.

21. In a machine for making cigars, the thimble having the recess to receive the head end of the cigar, and rotary means for holding the cigar, combined with the oscillatory wrapper-trimming knife 112 adjacent to the end of the said thimble, the shaft 114 carrying said knife and having the segment 124, the rack-bar 125 in engagement with said segment, the guide-rod 126 guiding said rack-bar 125, the lever-arm 128 connected at its front end with said rack-bar 125, the driving-shaft 31, the cam 127 on said driving-shaft and having a projecting portion to actuate said lever-arm 128 to move the rack-bar 125 in one direction, the pin 138 on said cam 127 for engaging said lever-arm 128 and to move said rack-bar 125 in the opposite direction, the projections 135 on said cam to cause said knife 112 to make distinct thrusts with its respective blades, and means, as a screw 136, for regulating the action of said cam on said arm 128 and knife 112; substantially as set forth.

22. In a cigar-making machine, the thimble having the recess to receive the head end of the cigar, and rotary means for holding the cigar, combined with a hinged paste-nozzle 139 for supplying paste to the cigar-wrapper and hammering the head end of the cigar, means for supplying paste to said nozzle, the cam 147 having the series of projections 154 and blank spaces 157 intermediate said projections, means intermediate said cam 147 and said paste-nozzle whereby said cam may raise and lower said nozzle and through said projections 154 effect the hammering action of said nozzle, the oscillatory knife 112 having the series of blades for trimming the wrapper at the head end of the cigar adjacent to the end of said thimble, the cam 127 having the series of projections 135, and means intermediate said cam 127 and said knife 112 whereby said cam is enabled to impart an oscillating motion to said knife and through said projections 135 cause the respective blades of said knife to make distinct thrusts through the tobacco-leaf, said blank spaces 157 of the cam 147 and said projections 135 of the cam 127 being arranged with respect to one another so that said nozzle shall remain stationary in its lower position during the brief periods in which the blades of the said knife 112 are making their respective cuts through the tobacco-leaf; substantially as set forth.

23. In a cigar-making machine, the thimble having the recess to receive the head end of the cigar, the rotatory clamp-frame to hold the body of the cigar and rotate therewith, and means for rotating said frame, combined with the tuck-cutting knives 205 and 206, the plate 218 in engagement with the shank ends of said knives and adapted by its movement to open and close said knives, the cam 222 to engage said plate 218 for opening said knives, the spring 220 to close the knives upon the cigar without cutting through the latter, means for actuating said cam 222 for thereafter compelling said knives to cut off the tuck end of the cigar, the oscillatory shaft 64 upon which said cam 222 is mounted, the crank-arms 233, 234 connected with said shaft 64, the driving-shaft 31, the cam 231 mounted on said driving-shaft and having the projection 239, the arm 235 pivoted to said crank-arm 234 and having its roller 237 in position to be engaged by said cam 231, and the spring 240 acting against said shaft 64, said spring assuring the relation of the crank-arm 233 to the said projection 239 on the cam 231, and also the relation of the roller 237 of the arm 235 with the cam 231; substantially as set forth.

24. In a cigar-making machine, the thimble having the recess to receive the head end of the cigar, the rotatory clamp-frame to hold the body of the cigar and rotate therewith, and means for rotating said frame, combined with the tuck-cutting knives 205 and 206, the plate 218 in engagement with the shank ends of said knives and adapted by its movement to open and close said knives, the carriage 209 supporting said plate, the shaft 31 and oscillatory shaft 64 supporting said carriage, the cam 222 mounted on said oscillatory shaft 64 and adapted to engage said plate 218 under the movement of said oscillatory shaft 64, the spring 220 also acting against said plate 218, and means operable from the driving-shaft for actuating said oscillatory shaft 64 and cam 222 first in one direction to open said knives, then to a certain extent in the opposite direction to allow said knives to close under the tension of said spring upon the body of the cigar, and then to a further extent in said opposite direction so as to compel said knives to cut through the body of the cigar; substantially as set forth.

Signed at New York, in the county of New York and State of New York, this 7th day November, A. D. 1900.

JOHN R. WILLIAMS.

Witnesses:
CHAS. C. GILL,
GUNDER GUNDERSON.